United States Patent
Kulawiec et al.

(10) Patent No.: US 9,097,612 B2
(45) Date of Patent: Aug. 4, 2015

(54) INTEGRATED WAVEFRONT SENSOR AND PROFILOMETER

(71) Applicant: QED Technologies International, Inc., Aurora, IL (US)

(72) Inventors: Andrew Kulawiec, Fairport, NY (US); Paul Murphy, Rochester, NY (US); Jon Fleig, Rochester, NY (US)

(73) Assignee: QED Technologies International, Inc., Aurora, IL (US)

( * ) Notice: Subject to any disclaimer, the term of this patent is extended or adjusted under 35 U.S.C. 154(b) by 54 days.

(21) Appl. No.: 14/087,363

(22) Filed: Nov. 22, 2013

(65) Prior Publication Data

US 2014/0152999 A1   Jun. 5, 2014

Related U.S. Application Data

(60) Provisional application No. 61/732,084, filed on Nov. 30, 2012.

(51) Int. Cl.
| | |
|---|---|
| *G01B 11/02* | (2006.01) |
| *G01M 11/00* | (2006.01) |
| *G01M 11/02* | (2006.01) |

(52) U.S. Cl.
CPC .......... *G01M 11/005* (2013.01); *G01M 11/025* (2013.01); *G01M 11/0271* (2013.01)

(58) Field of Classification Search
CPC .......... G01B 11/2441; G01B 9/02038; G01B 9/02087; G01M 11/02; G01M 11/0271; G01M 11/0207
USPC .......................................................... 356/512
See application file for complete search history.

(56) References Cited

U.S. PATENT DOCUMENTS

| | | | |
|---|---|---|---|
| 8,902,431 B2 * | 12/2014 | Liesener et al. | 356/479 |
| 2007/0013918 A1 * | 1/2007 | Hauger et al. | 356/512 |
| 2009/0251702 A1 * | 10/2009 | Murphy et al. | 356/450 |

* cited by examiner

*Primary Examiner* — Jonathan Hansen
(74) *Attorney, Agent, or Firm* — Thomas E Omholt; Thomas B Ryan

(57) ABSTRACT

An instrument for measuring aspheric optical surfaces includes both an optical wavefront sensor and a single-point optical profilometer. The optical wavefront sensor measures surface height variations throughout one or more areas of an aspheric test surface. The single-point profilometer measures surface height variations along one or more traces on the aspheric test surface. At least one of the traces intersects at least one of the areas, and respective spatial frames of reference for the traces and areas are relatively adapted to each other by minimizing differences between points of nominal coincidence between the areas and traces.

31 Claims, 11 Drawing Sheets

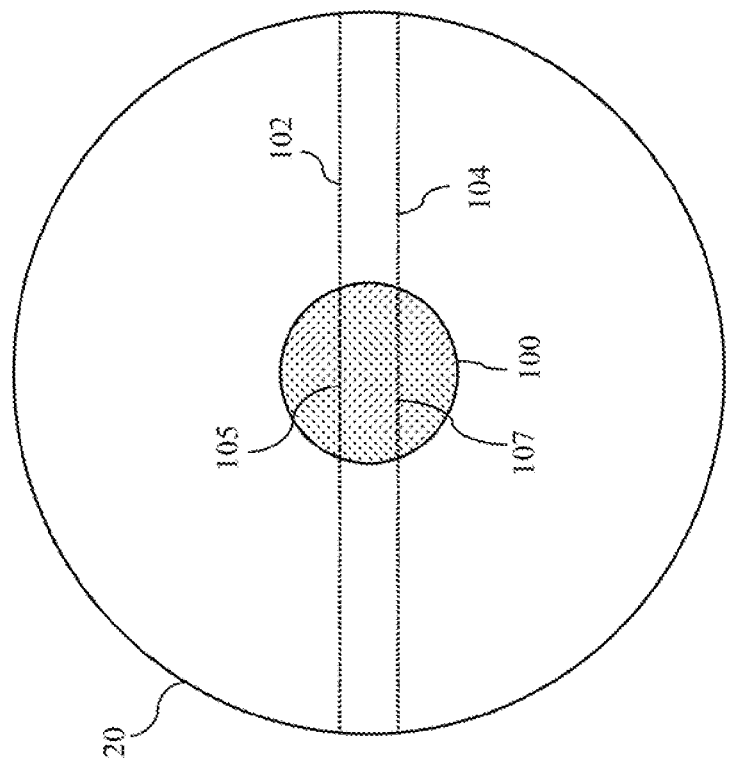
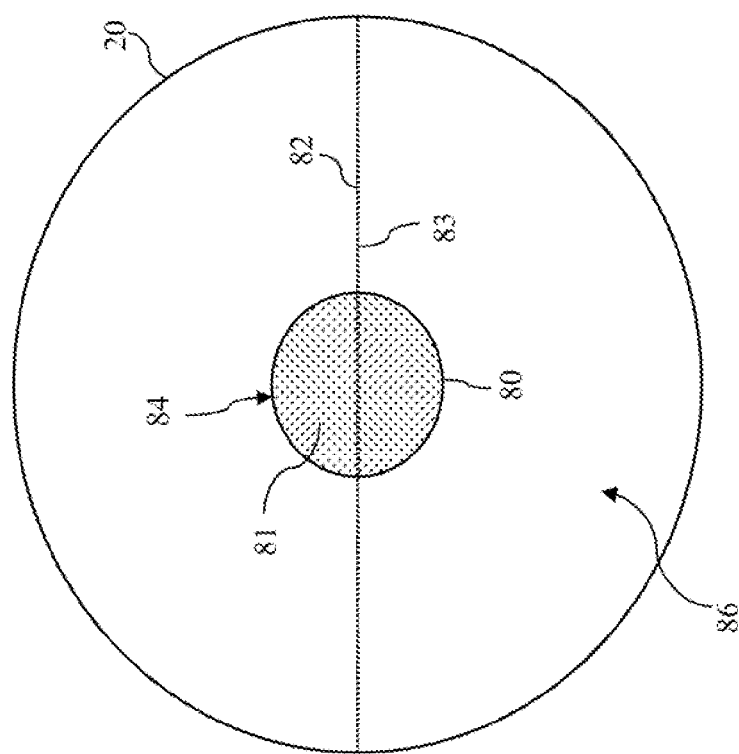
FIG. 5B
FIG. 5A

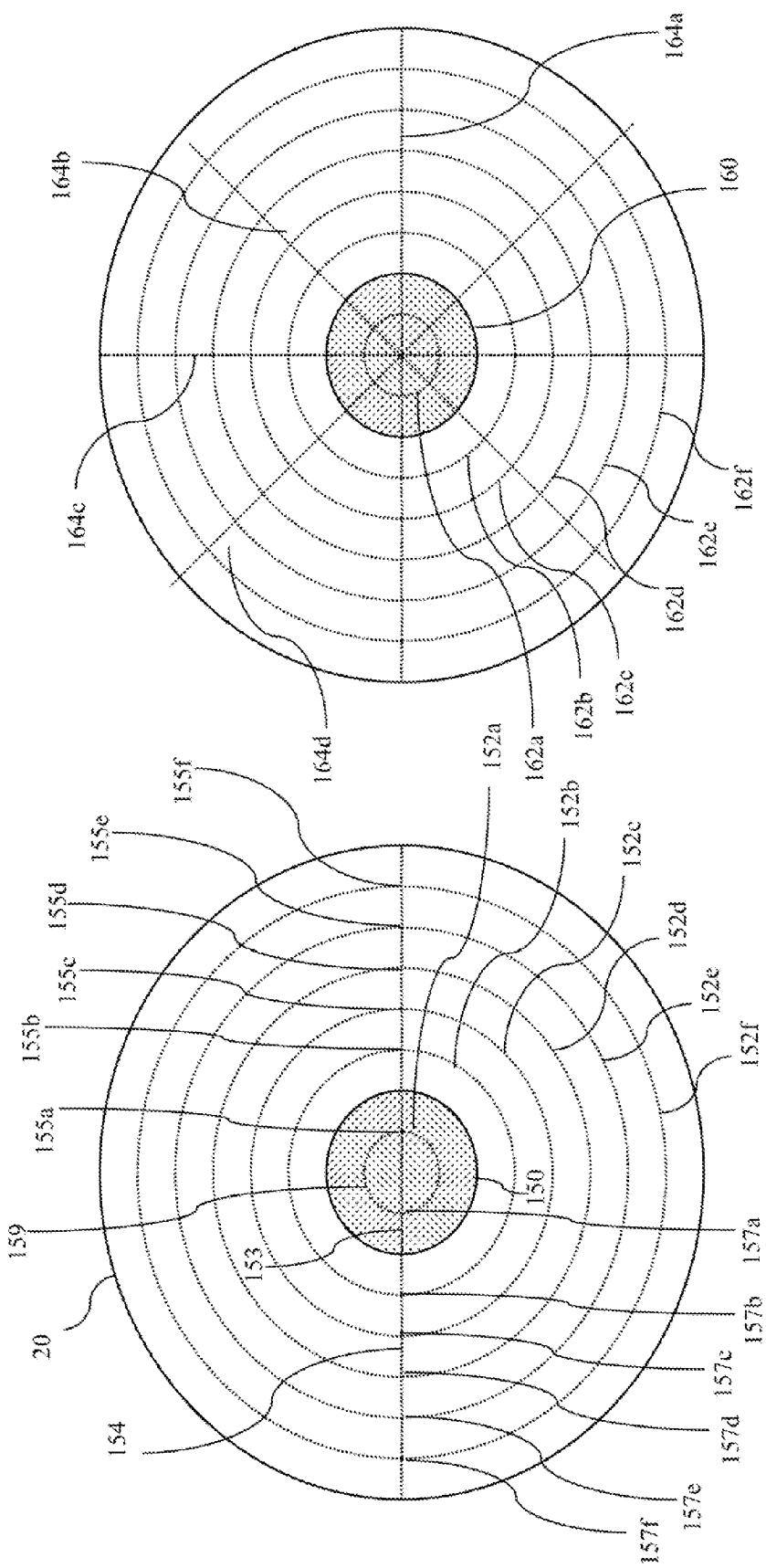

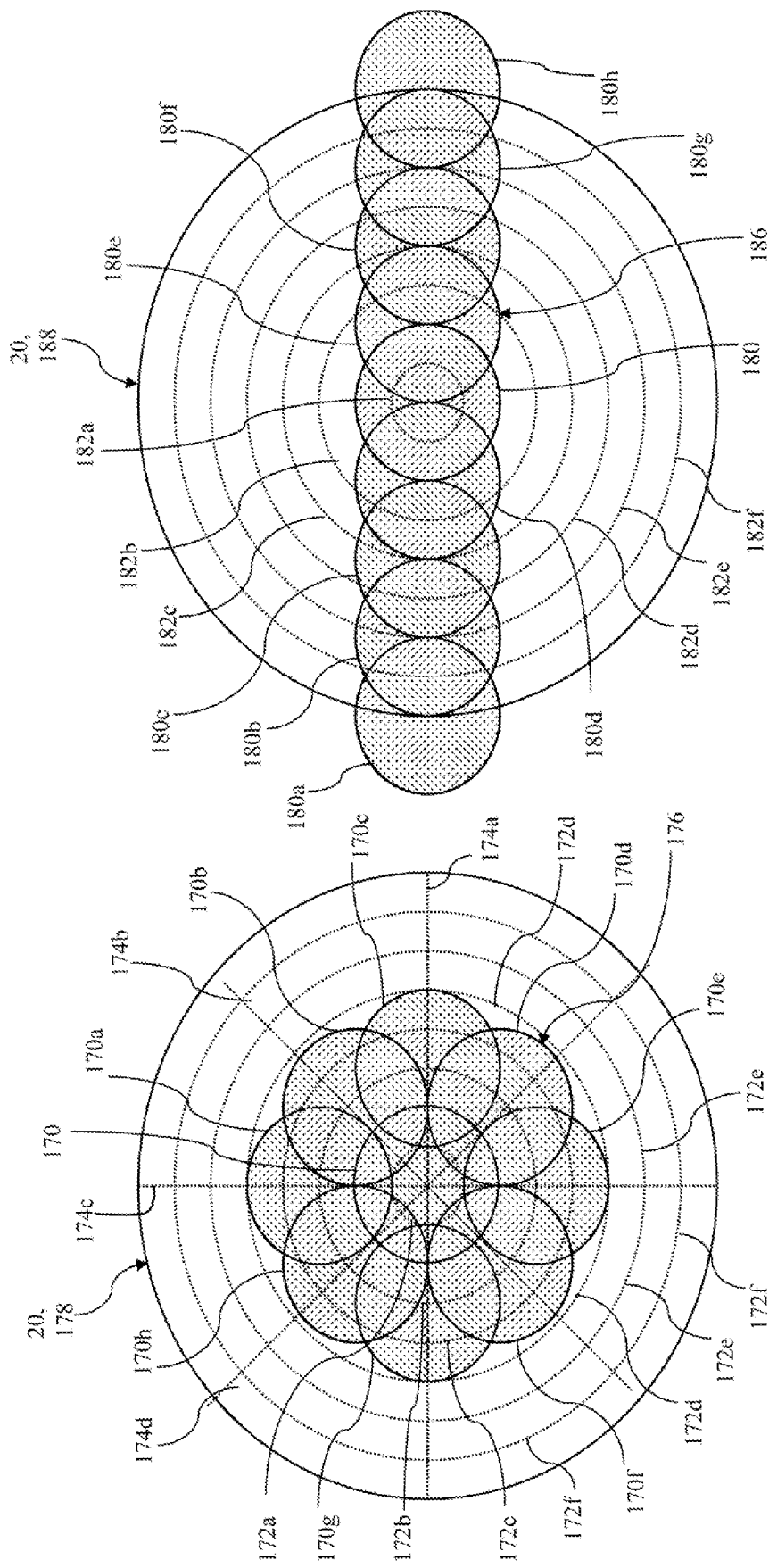

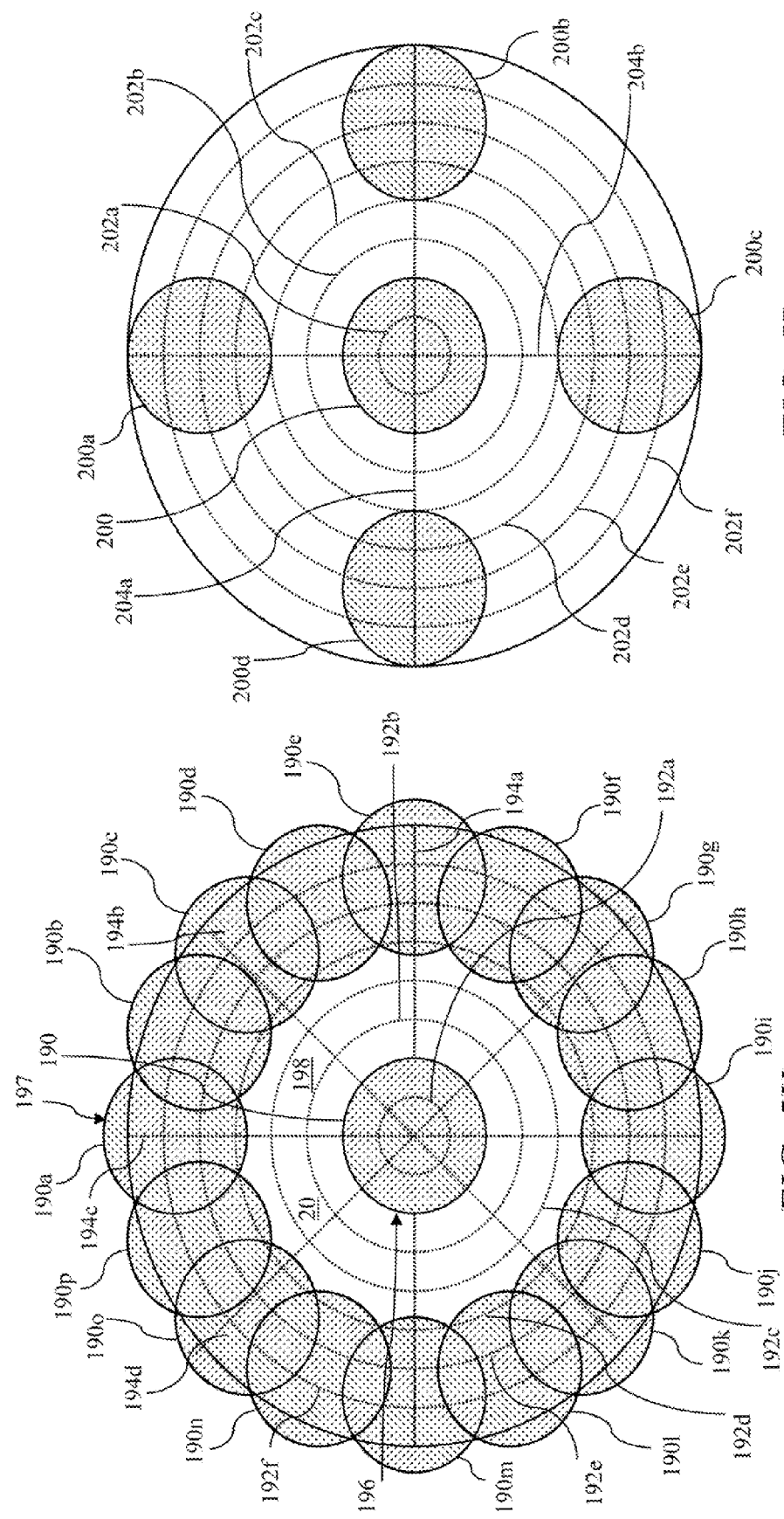

INTEGRATED WAVEFRONT SENSOR AND PROFILOMETER

TECHNICAL FIELD

Within the field of optical metrology, the invention concerns the measurement of aspheric surfaces using a combination of optical measuring techniques, and as such, is particularly related to both optical wavefront sensing and single-point profilometry, as well as the integration of measurements taken by such techniques.

BACKGROUND

Aspheric surfaces, which can be defined generally as surfaces that depart from planes, cylinders, and spheres, present a number of challenges to their measurement beyond those of surfaces having simpler forms. Despite the increased difficulty of their measurement, aspheric surfaces must often be measured to accuracies similar to the accuracies at which surfaces of simpler forms are measured. Particularly problematic for the measurement of aspheric surfaces are large variations in local curvatures and slopes of the aspheric surfaces, which can be difficult to both capture and compare to a datum.

Among conventional surface measurement techniques, optical wavefront sensing generally provides for measuring limited size areas (i.e., subapertures) of test surfaces to high accuracy. A plurality of such subaperture measurements is often required to measure the entirety of the test surfaces. Redundant data within regions of overlap between adjoining subaperture measurements can be used to compensate for positioning uncertainty and other differences between the measurements by "stitching" the subaperture measurements together to form composite measurements of the test surfaces.

However, the range of surface variations that can be accommodated by conventional wavefront sensing techniques is limited. Generally, a measurement wavefront is generated in a reference shape, such as a spherical shape, that approximates the expected shape of the test surface to which it is directed. Upon encountering the test surface (e.g., reflecting from the test surface), the shape of the measurement wavefront is aberrated in accordance with any differences between the actual shape of the test surface and the original shape of the measurement wavefront. Wavefront sensors record the aberrations in the returning measurement wavefront. The curvature and slope variations of many aspheric surfaces can produce aberrations in such measurement wavefronts that are beyond the range of many wavefront sensors or beyond the apertures of the optics that convey the measurement wavefronts to the sensors.

Approaches for extending the range of surface variations that can be accommodated by conventional wavefront sensing techniques include reducing the size of the subapertures and adjusting the reference shape of the measurement wavefront to better match the intended shape of the individual subaperture surface areas under test. Reducing the size of the subaperture measurements increases the number of subaperture measurements, which typically increases the attendant amount of processing for stitching the subapertures together as well as the uncertainty of the stitched measurement. Adjusting the reference shape of the measurement wavefront increases sources of error and measurement ambiguity because the shape adjustments themselves must be measured or otherwise determined so that the reference shape can be used as a datum against which the aberrations in measurement wavefront can be compared.

Another conventional surface measurement technique, single-point profilometry, uses a probe (e.g., mechanical or optical probe) for measuring one point on the test surface at a time. While the probe itself generally takes measurements along a single dimension, the relative motions between the probe and the test surface must also be measured in other relative dimensions to relate the different measurements of the probe to each other and to the intended shape of the test surface. For measuring aspheric surfaces, particularly with optical probes, motions along/about both rotational and translational axes are generally required to position the probe substantially normal to the different measured points on the aspheric surface. The measurements of the multiple axes are difficult to achieve to required accuracy, and the measurement of a large number of individual points to cover the test surface with sufficient resolution is time consuming.

SUMMARY OF INVENTION

The invention, among its preferred embodiments, combines techniques of both optical wavefront sensing and single-point profilometry to measure a wider range of aspheric surfaces, particularly such surfaces that include variations in slope or curvature that cannot readily be represented by conventionally generated wavefronts. At least one limited region of such an aspheric surface is measured by an optical wavefront sensor, and an extended region of the same aspheric surface is measured by a single-point profilometer. Each limited region of the aspheric surface measured by the optical wavefront sensor preferably has more limited slope or curvature variations that allow one or more overlapping subapertures within each of the limited regions to be readily approximated by conventionally generated optical wavefronts. The extended region of the aspheric surface measured by the single-point profilometer can contain slope or curvature variations that cannot be so readily approximated by conventional optical wavefronts. Although the extended region could encompass the entire aspheric surface, the extended region overlaps at least a portion of the limited region measured by the optical wavefront sensor and extends beyond the limited region to measure at least some of the remaining aspheric surface. Any differences between the overlapping measurements can be minimized by relatively adjusting spatial frames of reference for the two measurement techniques for producing an integrated measurement of the two regions within a common spatial frame of reference.

The optical wavefront sensor can be arranged to measure an array of points within each of one or more areas (i.e., subapertures) of the limited region. The single-point profilometer can be arranged to measure a succession of points along each of one or more traces within the extended region. At least one of the traces extends into the limited region, such that a certain number of points along the trace coincide with an equal number of points within the one or more areas of the limited region. The coinciding points together with operational definitions of their spatial frames of reference provide a basis for integrating the measurements of the optical wavefront sensor and single-point profilometer within a common spatial frame of reference.

Although the optical wavefront sensor can measure only limited regions of the aspheric test surfaces, whole areas of the aspheric surfaces can be measured at once. Although the single-point profilometer can measure only one point at a time, the remaining regions of the aspheric surfaces having a more complicated shapes can also be measured. Together, the optical wavefront sensor and single-point profilometer can measure a wider range of aspheric surfaces than could be readily measured by an optical wavefront sensor alone and the aspheric surfaces can be measured at many more data points than could be readily measured by a single-point profilometer alone.

The limited field of view of the optical wavefront sensors allows measurement wavefronts having a simple spherical or planar form to approximate similarly limited-size areas of the aspheric test surfaces. Although more complicated measurement wavefronts can be formed to approximate larger areas of the aspheric test surfaces or areas with more complicated shapes, the shapes of the measurement wavefronts themselves must be determined, which can introduce other sources of error and measurement ambiguity. Thus, where possible, the simpler forms of the measurement wavefront are generally preferred.

To the extent the measurement wavefronts within the limited fields of view of the optical wavefront sensor can approximate the shapes of limited areas of the aspheric test surface, the optical wavefront sensor can be used to measure a plurality of partially overlapping areas of the aspheric surface. Relative motion between the optical wavefront sensor and the aspheric test surface is generally required to measure the plurality of areas. The domains of overlap between the areas contain redundant data whose differences can be minimized by conventional stitching algorithms with respect to common spatial frame of reference. Particularly if the measurement wavefronts have a simple form, e.g., spherical or planar, high densities of points measured by the optical wavefront sensors extending within the domains of overlap enable the individual measurements of the overlapping areas to be assembled into a common spatial frame of reference with high precision. That is, the large numbers of coinciding points available for processing by the stitching algorithms can be used to merge the measurements taken within different spatial frames of reference to high precision.

Single-point profilometers, as their name implies, measure one point on aspheric test surfaces at a time. Relative motion between the single-point profilometers and the aspheric test surfaces is generally required to measure succeeding points on the aspheric test surfaces. Given enough axes and range of relative motion, large variations in the slope or curvature of the aspheric surfaces can be measured. In accordance with preferred embodiments of the subject invention, the extended region measured by the single point profilometer extends beyond the one or more limited regions measured by the optical wavefront sensor.

The accuracy to which these relative motions of the single-point profilometers can be determined generally depends upon the precision of the axes themselves and the accuracy to which magnitudes of their motions can be measured. Motions imparted by multiple axes are particularly difficult to ascertain to a high accuracy. For particular purposes of the invention, the relative motion between succeeding points along an individual trace on an aspheric test surface is preferably limited to a single axis of motion, which axis itself preferably exhibits high precision (e.g., repeatability and exactness) and whose position can preferably be measured to high accuracy. The motion imparted by such high precision axes is preferably limited to motions in the intended directions of the axes. Thus, all of the succeeding points measured along such an individual trace can be accurately referenced to a single spatial frame of reference. More than one such trace can be captured within the extended region of the aspheric test surface to increase the number of points by which the extended region is measured.

Preferably, at least one such trace within the extended region of the aspheric surface intersects at least one area within the limited region of the aspheric surface that is measured by the optical wavefront sensor. The lines of intersection contain redundant data concerning a plurality of points on the aspheric test surface. Accordingly, the spatial frame of reference of the intersecting trace can be relatively adapted to the spatial frame of reference of the intersected area within the limited region to relate the combined measurements to a common frame of reference. Any remaining traces within the extended region measured by the single-point profilometer that do not intersect the limited region measured by the optical wavefront sensor preferably intersect each other. Although the number of redundant measurements at points of intersection between two traces may be limited, a common frame of reference can still be derived for the two traces.

Ultimately, all of the spatial frames of reference with which measurements are made by both the optical wavefront sensor and the single-point profilometer are adapted to a global frame of reference. The approach through which the spatial frames of reference are adapted to the global frame of reference is generally influenced by the number of redundant points among the measurements taken within the different spatial frames of reference and the relative certainty with which these points are known. Because of the generally larger numbers of redundant points between overlapping areas measured by the optical wavefront sensor, the overlapping areas generally influence the adaptations to the global frame of reference more than the generally fewer redundant points between intersecting traces measured by the single-point profilometer. Intermediate numbers of redundant points are generally associated with intersections of the traces measured by the single-point profilometer and the areas measured by the optical wavefront sensor, and the influence or these intermediate numbers of redundant points on the adaptations to the global frame of reference is largely proportional, i.e., less than the redundant points between overlapping areas but more than the redundant points between intersecting traces. However, allowances can be made based on the quantified uncertainties of the redundant points within their spatial frames of reference and the further quantified uncertainties through which the respective frames of reference are defined.

The measurements of both the optical wavefront sensor and the single-point profilometer measure relative local height variations of the aspheric surfaces to a high precision against a datum defined within spatial frames of reference. However, the spatial frames of reference themselves are generally less precisely known. For example, the radius of curvature of the measurement wavefront and the spatial location and orientation of the single-point profilometer may not be as precisely known. In addition, the relative position and orientation of the optical wavefront sensor with respect to any one position of the probe of the single-point profilometer may not be precisely known. However, by combining the two instruments and processing redundant data within overlapping portions of their regions of measurement, the measurement ambiguities of each instrument can be reduced and the composite measurement by both instruments can be measured to high precision against a common datum.

According to a preferred embodiment, the optical wavefront sensor and the single-point profilometer share a common optical axis, and any relative motion required for measuring different portions of an aspheric test surface can be imparted to the aspheric test surface. In fact, both the optical wavefront sensor and the single-point profilometer can share the same objective lens for (a) forming a converging or diverging measurement wavefront as may be required by the optical wavefront sensor and (b) forming a focused beam of light on the aspheric test surface as may be required by the single-point profilometer. For taking measurements with the optical wavefront sensor, the aspheric test surface can be relatively positioned along the optical axis at a confocal position at which the measurement wavefront reflects from the aspheric test surface at near normal incidence for measuring surface variations as aberrations in an otherwise spherical wavefront. For taking measurements with the single-point profilometer, the aspheric surface can be relatively positioned along the optical axis at a cat's eye position for measuring relative displacements of points on the aspheric surface with respect to the focal point of the objective lens, i.e., the center of curvature of the spherical wavefront. The displacement between the confocal and cat's eye measurement positions can be measured to determine the radius of curvature of the measurement wavefront at the confocal position. Particularly if sharing a common optical axis, the optical wavefront sensor and the single-point profilometer can be used together to resolve measurement ambiguities (such as the measurement wavefront's radius of curvature), as well as to calibrate the two instruments to each other and to the aspheric test surfaces.

One example of the invention as an apparatus for measuring an aspheric test surface includes (a) an optical wavefront sensor for measuring surface height variations throughout one or more areas of an aspheric test surface within a limited region of the aspheric test surface and (b) a single-point optical profilometer for measuring surface height variations along one or more traces on the aspheric test surface within an extended region of the aspheric test surface. The extended region includes both a portion that overlaps at least a portion of the limited region and a portion that does not overlap any of the limited region. A processor combines the surface height measurements of the wavefront sensor within the limited region with the surface height measurements of the single-point profilometer within the extended region at least in part by minimizing differences between the wavefront sensor and profilometer measurements within the overlapping portions the two regions. Produced thereby is an integrated array of surface height measurements for a combined region of the aspheric test surface that includes both the overlapping portions of the limited and extended regions and the non-overlapping portion of the extended region.

Preferably, the optical wavefront sensor includes a wavefront shaper for producing one or more measurement wavefronts each having a shape approximating a shape of one or more areas of the aspheric test surface and an imaging system for imaging each of the one or more areas of the aspheric test surface onto a detector for comparing the shape of each of the one or more measurement wavefronts to the shape of each of the one or more areas of the aspheric test surface. One or more motion stages preferably provide for relatively moving the optical wavefront sensor and the single-point profilometer with respect to a mounting fixture for the aspheric test surface for measuring both the one or more areas of the aspheric test surface within the limited region and the one or more traces on the aspheric test surface within the extended region. Preferably, the optical wavefront shaper and the single-point profilometer share one or more optics of an optical system having a common optical axis along which (a) the measurements of the optical wavefront sensor are made at a confocal position of the optical system and (b) the measurements of the single-point profilometer are made at a cat's eye position of the same optical system.

Another example of the invention as a method of measuring aspheric test surfaces includes generating one or more measurement wavefronts with a wavefront shaper. Each of the one or more measurement wavefronts has a curved shape approximating a curved shape of each of one or more areas of the aspheric test surface within a limited region of the aspheric test surface. The one or more measurement wavefronts as reflected from the one or more areas of the aspheric test surface are imaged onto a detector, and the one or more imaged measurement wavefronts are compared to a datum, such as a reference wavefront or a reference plane of a wavefront sensor, for obtaining measurements of surface height variations throughout each of the one or more areas of the aspheric test surface. A single-point profilometer focuses light onto each of a succession of points along one or more traces on the aspheric test surface within an extended region of the aspheric test surface. The extended region includes both a portion that overlaps at least a portion of the limited region and a portion that does not overlap any portion of the limited region. Signals from the single-point profilometer are monitored for obtaining measurements of surface height variations among the succession of points along the one or more traces on the aspheric test surface. The surface height measurements of the optical wavefront sensor within the limited region are combined with the surface height measurements of the single-point profilometer within the extended region by minimizing differences between the surface height measurements of the optical wavefront sensor and the single-point profilometer within the overlapping portions the two regions. An integrated array of surface height measurements is produced for a combined region of the aspheric test surface that includes both the overlapping portions of the limited and extended regions and the non-overlapping portion of the extended region.

Preferably, the optical wavefront sensor measures an array of points throughout each of the one or more areas, and the single-point profilometer measures a succession of points along each of the one or more traces on the aspheric test surface. Relative motion between the single-point profilometer and the aspheric test surface for taking measurements along each trace is preferably imparted by a limited number of axes of motion and is more preferably imparted by a single axis of motion. Each area has a spatial frame of reference for the array of measured points throughout each area, and each trace has a spatial frame of reference for the succession of points along each trace. One or more of the traces intersect one or more of the areas at nominally coinciding points on the aspheric test surface. The spatial frames of reference of each intersected area and each intersecting trace can be relatively adapted to a common frame of reference by minimizing differences between the nominally coinciding points within the common frame of reference for both the array of measured points throughout each area and the succession of points along each trace.

For example, the one or areas can include a first area having a first frame of reference and the one or more traces can include a first trace having a second frame of reference and a second trace having a third frame of reference. The first and second traces intersect the first area at first and second sets of nominally coinciding points on the aspheric test surface. The first, second, and third frames of reference are relatively adapted to a common frame of reference so that differences between the nominally coinciding points within each of the first and second sets are minimized within the common frame of reference for the first area and the first and second traces.

Alternatively, the one or more areas can include a first area having a first frame of reference and a second area having a second frame of reference. The one or more traces can include a first trace having a third frame of reference and a second trace having a fourth frame of reference. The second area overlaps a portion of the first area at a first array of nominally coinciding points on the aspheric test surface, and the first and second traces intersect at least one of the first and second areas at first and second sets of nominally coinciding points on the aspheric test surface. All four frames of reference are relatively adapted to a common frame of reference by sequentially or collectively minimizing differences between the nominally coinciding points within the first array and within each of the first and second sets.

A measurement axis of the single-point profilometer is preferably relatively moved with respect to a mounting fixture for the aspheric test surface for measuring the surface height variations among the succession of points along the one or more traces on the aspheric test surface within the extended region. A measurement axis of the optical wavefront sensor is also preferably relatively moved with respect to the mounting fixture for the aspheric test surface for measuring the surface height variations among the array of points within each of the one or more areas of the aspheric test surface within the limited region. The relative motions of the measurement axes of the single-point profilometer and the optical wavefront sensor are preferably imparted by one or more common axes of motion. The relative motions of the single-point profilometer for measuring the individual traces on the aspheric test surface are preferably limited to motion along/about a single axis of motion.

BRIEF DESCRIPTION OF THE DRAWING FIGURES

Figure 4:
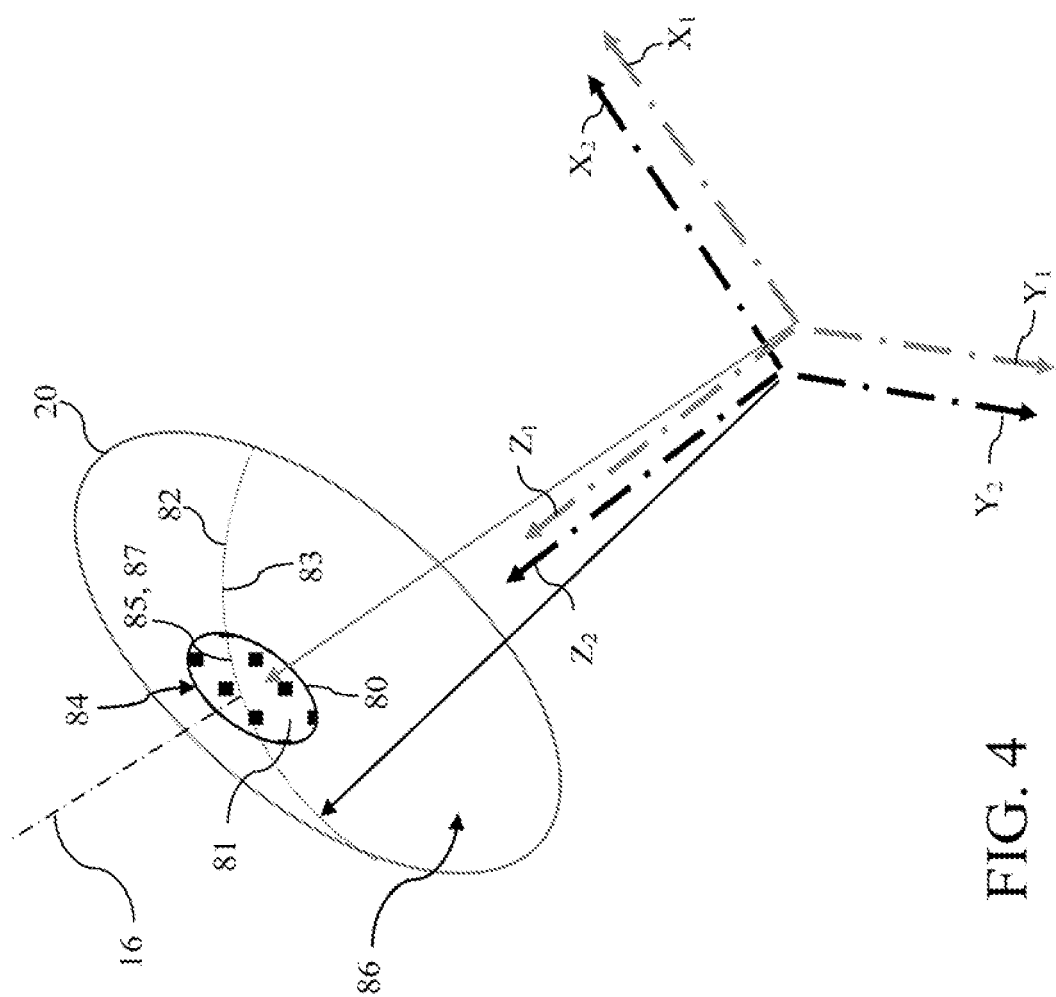

FIG. 4 is a perspective view of the aspheric test surface showing the combination of (a) a single area of measurement by the optical wavefront sensor referenced to first spatial frame of reference and (b) a single measurement trace of the single-point profilometer referenced to a second spatial frame of reference, with the two spatial frames of reference relatively displaced by an exaggerated amount for purposes of illustration.

FIGS. 5A-5L are similar axial views of the aspheric test surface showing the combination of one or more areas of measurement by the optical wavefront sensor with one or more measurement traces of the single-point profilometer.

Figure 6:
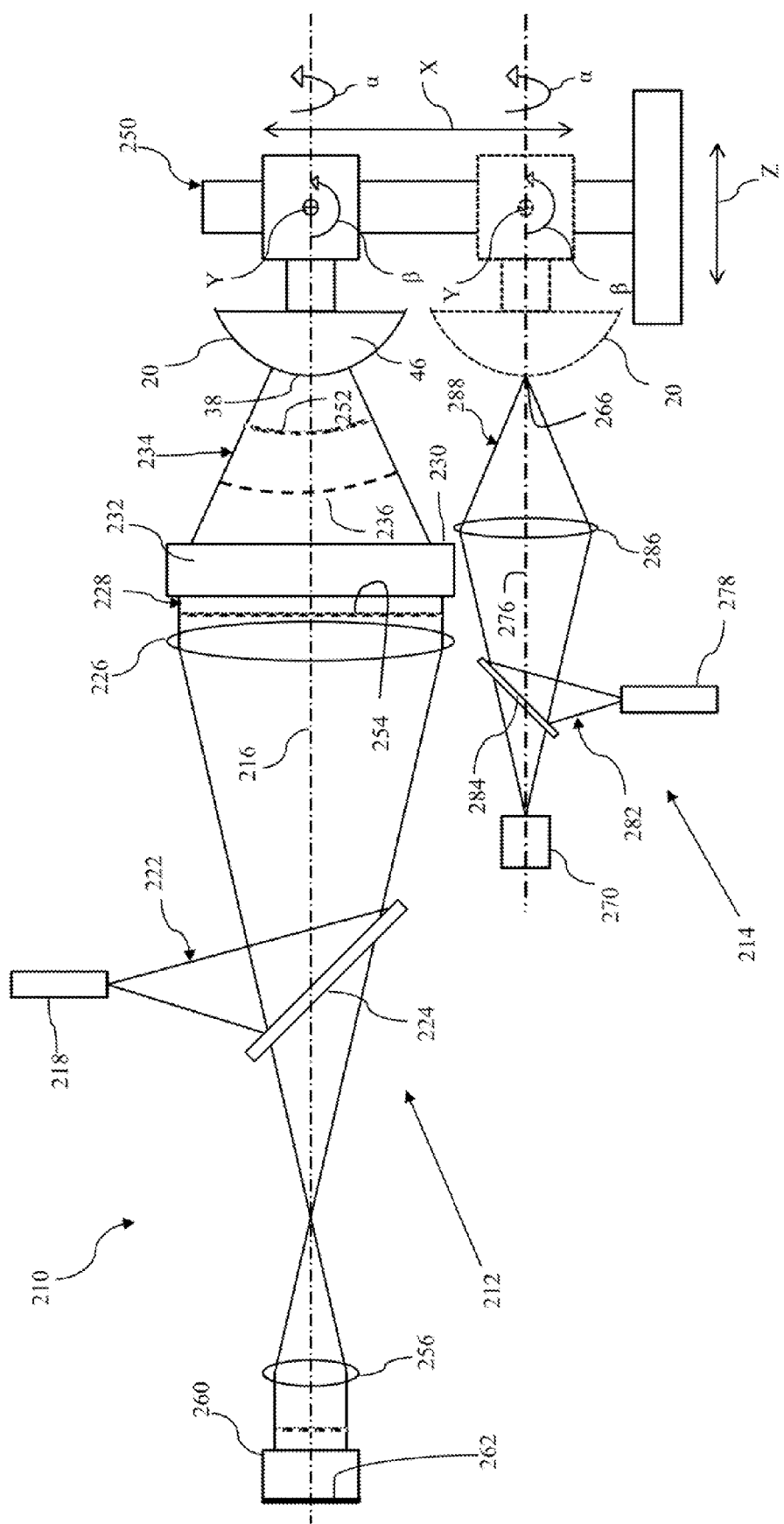

FIG. 6 is a diagram of an alternative arrangement for the integrated optical wavefront sensor and single-point profilometer operating along different but parallel optical axes sharing a multi-axis stage for relatively positioning an aspheric test surface with respect to both optical axes.

DETAILED DESCRIPTION

Figure 1:
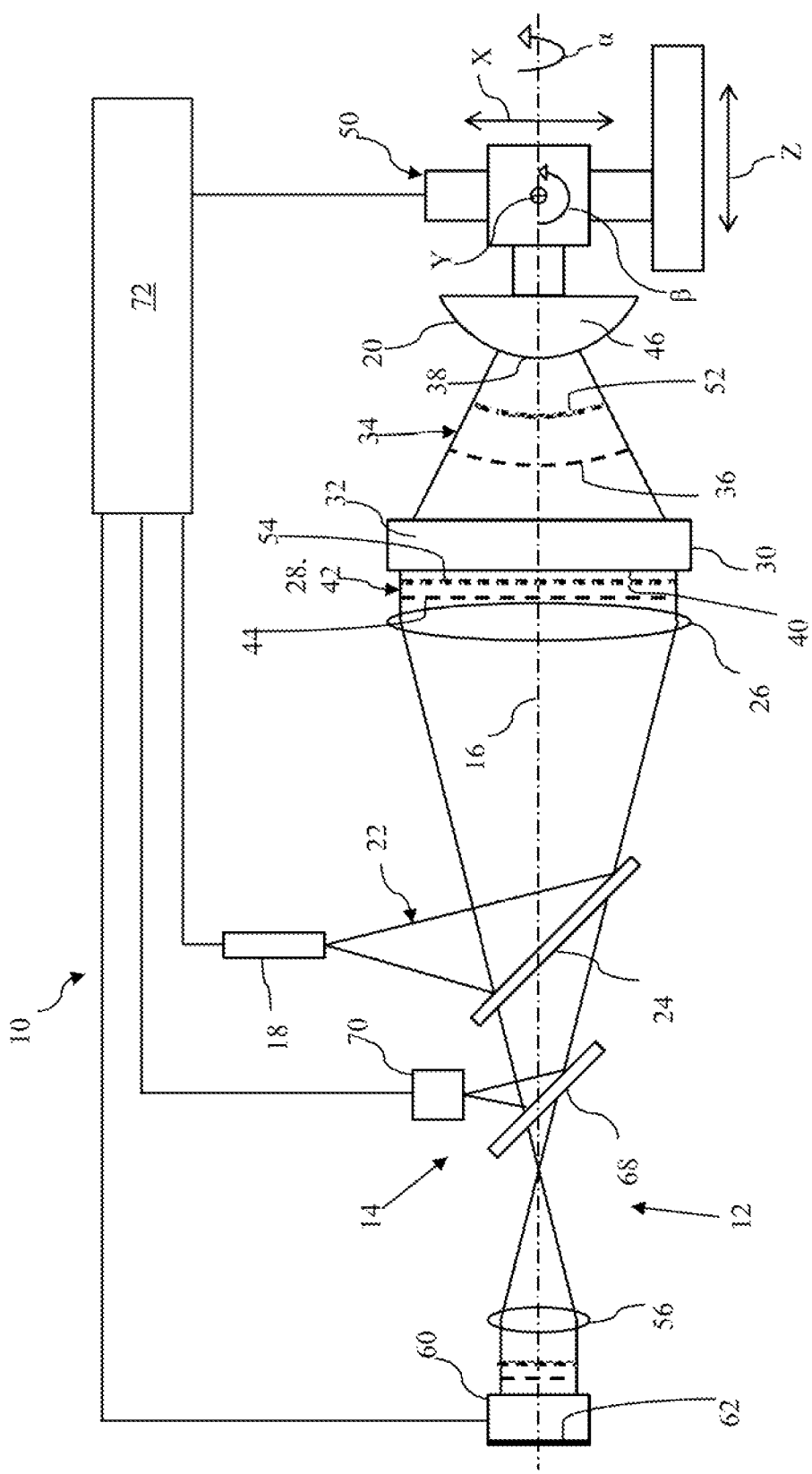
FIG. 1 is a diagram of an integrated optical wavefront sensor and single-point profilometer at a first setting for taking measurements of an aspheric test surface with the optical wavefront sensor.
Figure 2:
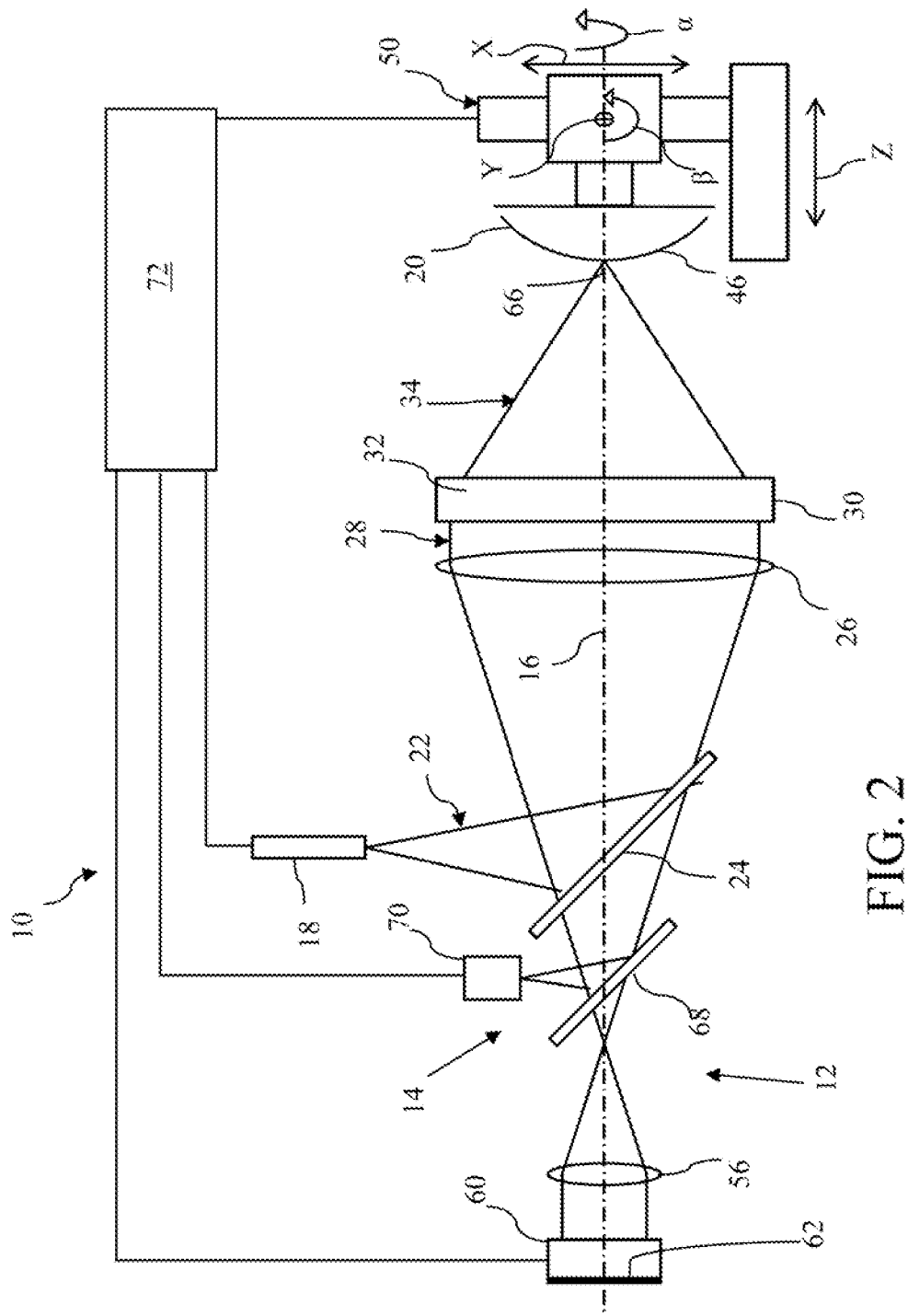
FIG. 2 is a diagram of the same integrated optical wavefront sensor and single-point profilometer at a second setting for taking measurements of an aspheric test surface with the single-point profilometer.

An embodiment of the invention as an integrated optical wavefront sensor and single-point profilometer 10 is depicted by FIGS. 1 and 2 at two different operational settings. In FIG. 1, the integrated optical wavefront sensor and single-point profilometer 10 is arranged for taking measurements as an optical wavefront sensor 12. In FIG. 2, the integrated optical wavefront sensor and single-point profilometer 10 is arranged for taking measurements as a single-point profilometer 14. The optical wavefront sensor 12 and the single-point profilometer 14 share a common optical axis 16 as well as a number of optics arranged along the optical axis 16 for conveying light from a common light source 18 to an aspheric test surface 20.

The common light source 18 emits a diverging measuring beam 22 of light that is reflected by a beamsplitter 24 for propagating along the optical axis 16. The light source 18 can be any known light source in common with both conventional optical wavefront sensors and single-point profilometers, such as a laser with beam-shaping optics for producing the required beam divergence. Preferably, the light source 18 is optimized with respect to the spatial and temporal coherence requirements of the optical wavefront sensor 12 and the single-point profilometer 14. Separate light sources could also be used to meet independent illumination requirements of the optical wavefront sensor 12 and single-point profilometer 14.

A collimating optic 26 converts the diverging measuring beam 22 into a collimated measuring beam 28 having a planar wavefront. An objective 30 includes a wavefront shaper 32 comprising one or more beam-shaping optics for generating a converging test beam 34 having a spherical test wavefront 36. Alternative or adjustable beam shaping optics within the wavefront shaper 32 can be used for generating test beams having other shapes. The shape of the test wavefront 36 preferably approximates the expected shape of an area 38 of the aspheric test surface 20 to which it is directed. When the optical wavefront sensor 12 is arranged as an interferometer, the objective 30 also includes a Fizeau reference surface 40 for retroreflecting a portion of the collimated measuring beam 28 as a reference beam 42 having a planar reference wavefront 44.

The aspheric test surface 20 is the surface of a test part 46 that is mounted on a multi-axis stage 50 having three orthogonal axes of translation, X, Y, and Z and two orthogonal axes of rotation, α and β. In the setting shown, the rotational axis a extends parallel with the Z translational axis and the rotational axis β extends parallel with the Y translational axis. Although the rotational axes α and β remain orthogonal to each other upon rotation about either axis α or β, rotation about the β rotational axis changes the orientation of the α rotational axis to the X and Z translational axes. A third orthogonal rotational axis can be provided as necessary to provide a full six degrees of freedom between the aspheric test surface 20 and the optical wavefront sensor 12 or the single-point profilometer 14. The various translational and rotational axes can be configured in other ways for such purposes as limiting the number of axes of motion required to achieve the desired relative motions. The rotational axes α and β are preferably fashioned as air bearings having high precision, particularly for purposes of repeatability and minimal error motions. Sensors provide for monitoring movements along the three translational axes X, Y, and Z and about the two rotational axes α and β.

To the extent that the area 38 of the aspheric test surface 20 matches the shape of the spherical test wavefront 36 at its points of incidence, the test wavefront 36 is retroreflected in its original form along its original path back to the objective 30. Thus, the aspheric test surface 20 is located along the optical axis 16 at a confocal position of the optical wavefront sensor 12. Any differences between the shape of the illuminated area 38 and the shape of the spherical test wavefront 36 at its points of incidence, produce changes in the test beam 34 that are registered in an aberrated test wavefront 52 reflected from the area 38.

Upon transmission through the objective 30, the aberrated test wavefront 52 is converted into an aberrated planar test wavefront 54. At the Fizeau reference surface 40 (assuming that the optical wavefront sensor 12 is arranged as an interferometer), the aberrated planar test wavefront 54 is recombined with the reflected planar reference wavefront 44. The collimating optic 26, in conjunction with another collimating optic 56, relays the aberrated planar test wavefront 54 together with the planar reference wavefront 44 to a detector 60, which when arranged for purposes of interferometric measurement captures a resulting interference pattern. The objective 30 together with the relaying optics 26 and 56 also participate in relaying an image of the area 38 of the aspheric test surface 20 onto a detector surface 62 of the detector 60 for relating pixels of the detector surface 62 to corresponding points within the area 38. For example, various measured intensities of the interference pattern captured by the pixels of the detector surface 62 can be analyzed in accordance with conventional practices to measure height variations of an array of corresponding points within the area 38 with respect to the original spherical shape of the test wavefront 36. Any differences between the shape of the spherical test wavefront 36 and the intended or ideal shape of the area 38 must also be considered for referencing the measured height variations with respect to the intended shape of the area 38 as a measure of errors in the aspheric test surface 20. A similar conversion is required for test wavefronts generated by the wavefront shaper 32 that depart from a spherical shape.

Although the optical wavefront sensor 12 has been described for operating as an interferometer, the same basic configuration of components can be used to operate the optical wavefront sensor 12 as a waveform-measuring instrument. In such an arrangement, the objective 30 does not include a Fizeau reference surface 40 for retroreflecting the reference wavefront 44. Only the aberrated planar test wavefront 54 is relayed to the detector 60, which can be arranged as a Shack-Hartman wavefront sensor that measures variations in the aberrated planar test wavefront 54 from a planar form. The local variations recorded by the pixels of the detector surface 62 are similarly analyzed in accordance with conventional practices to measure height variations of an array of points throughout the area 38 with respect to the original shape of the spherical test wavefront 36.

Generally, the measured aberrations in the aberrated test wavefront 54 do not directly correspond to deviations in the shape of the aspheric test surface 20 from its intended or ideal shape. Instead, the aberrations of the aberrated test wavefront 54 are measured against the original shape of the test wavefront 36, which, if not aberrated, returns to the detector 60 in a planar form. However, the original shape of the test wavefront 36 may only approximate the intended or ideal shape of the area 38. Thus, to measure height variations as errors in the shape of the area 38, any differences between the shape of the original test wavefront 36 and the intended or ideal shape of the area 38 must also be determined or otherwise known. Various techniques are known for determining the original shape of the test wavefront 36, and for spherical test wavefronts, all that remains to be determined is the radius of curvature of the spherical test wavefronts at their point of incidence upon the aspheric test surface 20. As further described below, the integrated single-point profilometer 14 provides for directly measuring such radii of curvature.

Although the optical wavefront sensor 12 is shown in FIG. 1 with a converging test beam 34 that is incident upon the aspheric test surface 20, the aspheric test surface 20 can be translated along the Z axis of the multi-axis stage 50 through a crossing point (see focus 66 of FIG. 2) at which the converging test beam 34 becomes a diverging test beam for similarly measuring areas of an aspheric test surface having a concave surface profile. Alternatively, a diverging test beam can be generated directly. One or more relative motions of the multi-axis stage 50 can also be imparted to measure other areas of the aspheric test surface 20, as will be further discussed below.

The same integrated optical wavefront sensor and single-point profilometer 10, as shown in FIG. 2, can also be arranged for taking measurements as the single-point profilometer 14. However, instead of relatively positioning the integrated optical wavefront sensor and single-point profilometer 10 at a confocal measurement position, the integrated optical wavefront sensor and single-point profilometer 10 is relatively positioned at a cat's eye measurement position at which a focus 66 of the converging test beam 34 is incident upon the aspheric test surface 20. Most, if not all of the optics can be the same as those arranged for use as the optical wavefront sensor 14. However, for purposes of expediency of measurement, the single-point profilometer 14 diverts a portion of the returning measuring beam 22 with a beamsplitter 68 to a focus detector 70 for measuring height variations of the aspheric test surface 20 at the focus 66 of the converging test beam 34. The focus detector 70 can take various conventional forms for interpreting the height variations using various conventional techniques such as intensity detection, focus variation, differential detection, astigmatic methods, focault methods, confocal microscopy, or phase measuring and fringe counting methods.

The single-point profilometer 14 can be optimized depending upon the type of focus detection technique chosen for measuring the relative heights of individual points on the aspheric test surface 20. For example, the spatial or temporal characteristics of the light source 18 can be adapted to the measurement technique, which may necessitate use of a second light source for the single-point profilometer 14. The second light source can be appended to the integrated optical wavefront sensor and single-point profilometer 10 using an additional beamsplitter similar to the beamsplitter 24.

In place of or in addition to the focus detector 70, the detector 60 can also be used for measuring height variations at the focus 66 using measuring techniques such as phase measuring and fringe counting methods of interferometry. In fact, the overall appearance of interference patterns generated by angular inversions (i.e., reflection) at points of focus led to the cat's eye name for such measurement positions.

The amount of relative translation of the integrated optical wavefront sensor and single-point profilometer 10 with respect to the aspheric test surface 20 along the optical axis 16 between the confocal position of the optical wavefront sensor 12 and the cat's eye position of the single-point profilometer 14, as may be imparted along the Z axis of the multi-axis stage 50, can be monitored as a measure of the radius of curvature of the test wavefront 36 at its point of incidence upon the aspheric test surface 20 (i.e., as a local radius over the region 38).

Spherical test wavefronts, such as the test wavefront 36, remain spherical throughout their propagation within converging or diverging test beams but the radii of curvature of the spherical test wavefronts vary with the convergence and divergence of the beam. The radius of curvature of the original test wavefront 36 at its point of incidence upon the spherical test surface 20 must be determined or otherwise known for use as a datum against which the height variations in the aberrated test wavefront 52 are measured. Thus, the single-point profilometer 14 can be used in conjunction with the optical wavefront sensor 12 to measure the radius of curvature of the test wavefront 36 to provide the required datum against which the height variations embodied within the aberrated test wavefront 52 can be measured. Since the optical wavefront sensor 12 and the single-point profilometer 14 share not only a common optical axis 16 but also the translational and rotational axes X, Y, Z, α, and β of the multi-axis stage 50, redundant measurements at different axis positions can be used to further calibrate the optical wavefront sensor 12 and the single-point profilometer 14 with respect to each other and to the aspheric test surface 20 or a known reference surface.

Relative motion between the integrated optical wavefront sensor and single-point profilometer 10 and the aspheric test surface 20 is required to measure additional areas or points on the aspheric test surface 20. The relative motion of the single-point profilometer 14, while requiring the collection of additional data concerning the motion, allows for the measurement of aspheric surfaces having greater variations in slope or curvature than would be practical for measurement with the optical wavefront sensor 12.

For measuring height variations at a succession of points on the aspheric test surface, the variations in the relative positions at which the single-point measurements are made must also be recorded to relate the measured height variations to positions on the aspheric surface. The relative translation and rotation of the point of focus 66 on the optical axis 16, as may be imparted by the multi-axis stage 50, defines a datum surface against which the height variations are referenced. Multiple axes of motions tend to compound positioning errors and detract from the accuracy with which the measurement datum can be defined. Accordingly, the single-point profilometer measurements are preferably acquired as successions of points on the aspheric surface 20 along individual traces produced by relative motion along or about a single translational X, Y, or Z or rotational α or β axis.

Figure 3:
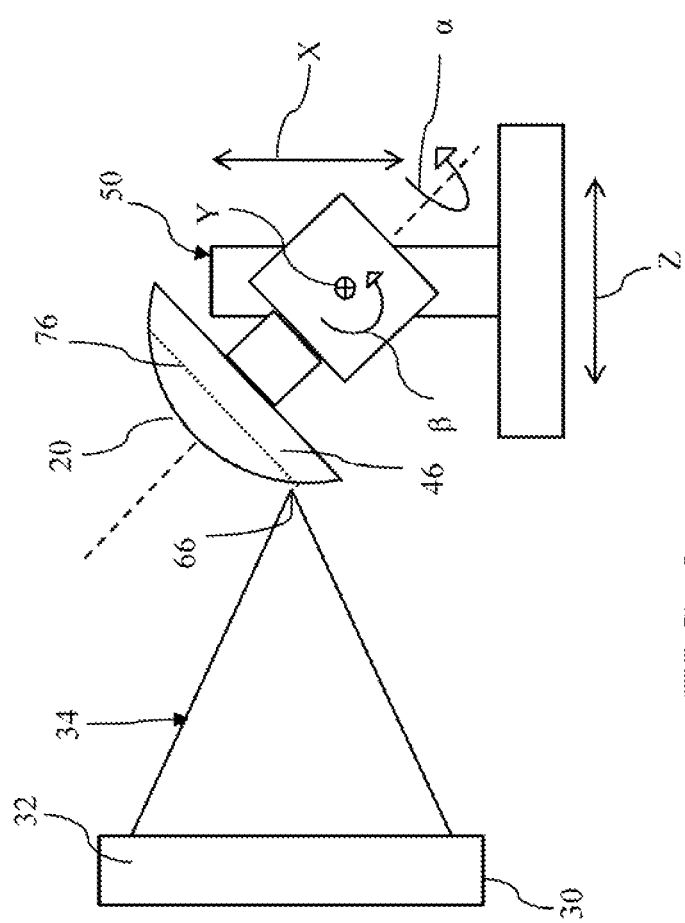
FIG. 3 is an isolated diagram showing the aspheric test surface inclined to the optical axis of the single-point profilometer for taking measurements along a circular trace on the aspheric test surface.

In FIG. 3, the aspheric test surface 20, which is assumed rotationally symmetric, is inclined at a fixed angle $\beta_1$ about the rotational axis β and is rotated about the rotational axis a through a sequence of measuring positions at which the focus 66 is moved along a circular trace 76 on the aspheric test surface 20. The rotational motion about the rotational axis α is preferably continuous and the individual measurements at the sequence of measuring positions are preferably collected at a given sampling rate or integration interval. The rotational axis P, as well as the three translational axes X, Y, and Z, is fixed for all of the measurements. Motion only occurs about the rotational axis α, which is preferably an axis having a high accuracy, repeatability, and resolution. The only positional data that must be captured between measured points along the trace 76 is the change in angular position about the α axis. Repeated measurements can be taken along the same trace 76 to assess the certainty of the measurement or to improve the accuracy of the measurements. Similar traces can be measured to high accuracy at different settings of the multi-axis stage 50 to collect information over other portions of the aspheric test surface 20. The high relative positional accuracies with which the points along individual traces can be measured enable all of the measured points along an individual trace to share a common spatial frame of reference. The spatial frame of reference associated with each of the traces (i.e., the relative orientation and position of the trace) can be approximated from measurements of the relative positions of the axes (e.g. X, Y, Z, and β) that are fixed during the individual traces. However, the accuracies with which the spatial frames of reference are known for the individual traces are generally less than the accuracy at which the points are required to be measured. While motion along/about more than one axis may be required to measure successions of points along traces on aspheric surfaces that lack rotational or translational symmetry, the number of axes of motion is preferably minimized to reduce sources of error between the measured points within each trace.

As shown for example in FIG. 4, the optical wavefront sensor 12 acquires an array of contiguous measured points 81 throughout a limited region 84 and the single-axis profilometer 14 acquires a succession of measured points 83 along a meridional trace 82 within an extended region 86 of the aspheric test surface 20. In the example, the limited region 84 measured by the optical wavefront sensor 12, which otherwise might contain a plurality of overlapping areas of measurement, comprises a single central area 80 within which the measured points 81 are acquired at a single setting of the optical wavefront sensor 12. Similarly, the extended region 86, which otherwise might contains a plurality traces for more thoroughly characterizing the extended region 86, contains the single meridional trace 82 along which the measured points 83 are acquired at a single setting of the single-point profilometer 14.

Although the meridional trace 82 renders the extended region 86 somewhat ambiguous absent an assumption of rotational symmetry for the aspheric test surface 20, the extended region 88 clearly overlaps the limited region 84 while also extending beyond the limited region 84. Thus, the limited region 84 provides measurements of a relatively confined space within the aspheric test surface 20 while the extended region 86 provides measurements of an attribute of the entire aspheric test surface 20.

The array of measured points 81 within the central area 80 of the limited region 84 is referenced to a first spatial frame of reference $\mathfrak{R}_1$, based on the measured positions of the axes X, Y, Z, α, and β of the multi-axis stage 50, which are fixed during the acquisition of the central area 80 by the optical wavefront sensor 12. All of the measured points 81 within the central area 80 share the same first spatial frame of reference $\mathfrak{R}_1$ but differ within the first spatial frame of reference $\mathfrak{R}_1$ by both their respective measures of height and their positions within the central area 80 extrapolated from detector surface 62. In addition, the succession of measured points 83 along the meridional trace 82 are referenced to a second spatial frame of reference $\mathfrak{R}_2$ based on the measured positions of the fixed axes X, Y, Z, and a of the multi-axis stage 50 during the acquisition of the meridional trace 82 by the single-point profilometer 14. All of the measured points 83 along the meridional trace 82 share the same second spatial frame of reference $\mathfrak{R}_2$ but differ within the second spatial frame of reference $\mathfrak{R}_2$ by both their respective measures of height and their relative displacements measured about the β rotational axis of the multi-axis stage 50. The spatial frames of reference $\mathfrak{R}_1$ and $\mathfrak{R}_2$ can be defined in Cartesian coordinates or other coordinates of choice.

A certain number of the measured points 83 along the single meridional trace 82 nominally coincide with an equal number of the measured points 81 within the central area 80, defining a set of paired nominally coinciding points 85, 87. Based on the measured orientations of the two spatial frames of reference $\mathfrak{R}_1$, and $\mathfrak{R}_2$ via the coordinate axes X, Y, Z, α, and β, the measured points 81 and 83 can be projected onto a common global grid to identify the nominally coinciding points 85, 87. Although an exact one-to-one correspondence between the measured points 85 of the central area 80 and the measured points 87 of the meridional trace 82 is not always found, the required coincidence can easily be achieved by interpolating between the measured points 81 of the central area 80, which are dispersed throughout a contiguous area of the aspheric test surface 20. Essentially, all of the points along a line intersecting an area have corresponding points within the area. Thus, the measured points can be deemed to coincide as nominally coinciding points even though their measures differ because of different frames of reference or for other reasons such as limitations on the density of points or the accuracy with which they are measured.

Although nominal spatial coincidence can be found between the points 85 and 87 where the meridional trace 82 overlaps the central area 80, the measured relative heights of the coinciding points 85 and 87 often differ from one another on a finer scale. Both the optical wavefront sensor 12 and the single-point profilometer 14 are generally capable of measuring height variations with respect to their spatial frames of reference $\Re_1$ and $\Re_2$ to very high accuracies, which are higher than the accuracies to which the locations and orientations of their corresponding spatial frames of reference $\Re_1$ and $\Re_2$ are known. By assuming that the measured height differences can be attributed to small errors in the relative position and orientation of their corresponding spatial frames of reference $\Re_1$ and $\Re_2$, a convergence algorithm can be used to relatively adjust (e.g., by coordinate transformations) the two spatial frames of reference $\Re_1$ and $\Re_2$ within their margin of error to collectively minimize the measured height differences between the coinciding points 85 and 87 with respect to a common spatial frame of reference (which in this instance could be either of the spatial frames of reference $\Re_1$ or $\Re_2$). Since all of the remaining points 81 within the central area 80 and the remaining points 83 along the meridional trace 82 are measured with respect to the same two original spatial frames of reference $\Re_1$ and $\Re_2$, the convergence algorithm relates all of the measured points 81 and 83 within the central area 80 and along the meridional trace 82 to the common spatial frame of reference as a composite measurement of the limited and extended regions 84 and 86 of the aspheric test surface 20.

Algorithms of this sort are already known for stitching together overlapping areas of optical wavefront sensors. Examples of such algorithms can be found in co-owned U.S. Pat. No. 6,956,657 of Golini et al., U.S. Pat. No. 7,433,057 of Murphy et al., and U.S. Pat. No. 8,203,719 of Murphy et al., which are all hereby incorporated by reference. These algorithms can be similarly used for stitching together areas (e.g., 80) of the optical wavefront sensor 12 with traces (e.g., 82) of the single-point profilometer 14 based on an assumption that all of the measured points 83 along the meridional trace 82 share a common spatial frame of reference $\Re_2$. By limiting the relative motions of the single-point profilometer 14 through which measurement data is captured along the traces (e.g., 82) and by using high precision axes, such as air bearings, for carrying out these motions (such a motion limited to about rotational axis β), single frames of reference (e.g., $\Re_2$) can be assumed for the measured points (e.g., 83) along the individual traces (e.g., 82).

The convergence algorithms can be programmed within computer memory accessible to a processor 72 (see FIGS. 1 and 2) that receives the measurements of height (or information that can be so interpreted) from both the detector 60 of the optical wavefront sensor 12 and the detector 70 of the single-point profilometer 14, as well as the measurements of the relative positions of the aspheric test surface 20 with respect to the integrated optical wavefront sensor and single-point profilometer 10 from the multi-axis motion stage 50. In general, the spatial frames of reference (e.g., $\Re_1$ and $\Re_2$) are derived from the positions of the axes of the multi-axis stage 50 that are fixed during the collection of data for a given area (e.g., 80) or trace (e.g., 82). However, the positions of measured points (e.g., 81 and 83) within the spatial frames of reference are derived differently for the optical wavefront sensor 12 and the single-point profilometer 14. For example, the positions of the measured points 81 within the central area 80 can be based on the imaging characteristics of the optical wavefront sensor 12 for reproducing the central area 80 of the aspheric test surface 20 onto the detector surface 62 at a given magnification. The positions of the measured points 83 along the meridional trace 82 can be based on the measured movements between the measured points 83 along/about preferably a single axis (e.g., β), which can be measured to a high degree of accuracy. The high precision of the axis (e.g., β) for taking measurements along individual traces (e.g., 82) assures that the imparted motion is limited to motion along/about the intended axis (e.g., β) and none other within the desired accuracy of the ultimate measurement.

For example, spatial frame of reference of each of the one or more areas can be defined by a set of wavefront sensor compensators, each having an amplitude and a functional form representing the influence of a known variable on the area spatial frame of reference. Similarly, the spatial frame of reference of each of the one or more traces can be defined by a set of profilometer compensators, each having an amplitude and a functional form representing the influence of a known variable on the trace spatial frame of reference. Each of the compensators, for example, can be arranged to define the effect of an axis of motion on a spatial frame of reference. Additional compensators can be used for such purposes as defining mapping distortion, measurement bias (e.g., reference wave, beam sag), instrument transfer function, and noise characteristics.

At least one of the one or more traces overlapping at least one of the one or more areas on the aspheric test surface defines a set of overlapping surface height measurements. The processor that combines the surface height measurements of the optical wavefront sensor with the surface height measurements of the single-point profilometer by identifying amplitudes of the wavefront sensor compensators and the profilometer compensators whereby differences between the overlapping surface height measurements of the optical wavefront sensor and the single-point profilometer are minimized within a common frame of reference.

FIGS. 5A through 5L depict various combinations of areas captured by the optical wavefront sensor 12 and traces captured by the single-point profilometer 14 exemplifying different ways in which the measurements of the optical wavefront sensor 12 and the single-point profilometer 14 can be combined for producing a composite measurement over different regions of the aspheric test surface 20.

Figure 5D:
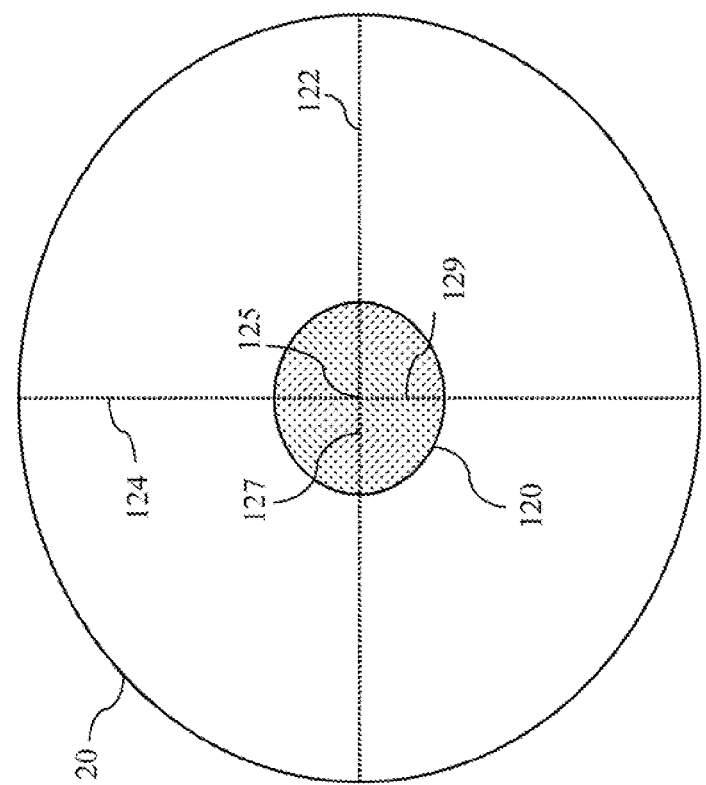

For purposes of comparison to plan view, the single central area 80 and meridional trace 82 of FIG. 4 are reproduced in FIG. 5A. Although not shown in FIG. 5A or in other drawings of the exemplary sequence (FIGS. 5B-5J), the array of points (e.g., 81) within each of the areas (e.g., 80) and the succession of points (e.g., 83) along each of the traces (e.g., 82) are measured with respect to individual spatial frames of reference (e.g., $\Re_1$ and $\Re_2$) that are relatively adaptable by coordinate transformations. Contiguous areas occupied by the areas (e.g., 80) are regarded as the limited regions measured by the optical wavefront sensor 12 and areas whose measurement values can be extrapolated from the traces are regarded as the extended regions measured by the single-point profilometer 14. The extended regions measured by the single-point profilometer 14 can include measurements representative of any or all of the aspheric surface 20 but, generally, at a much lower density of points.

In FIG. 5B, a single central area 100 of the optical wavefront sensor 12 is intersected by two traces 102 and 104 of the single-point profilometer 14 that extend beyond the single central area 100 for expanding the measurement of the aspheric test surface 20 beyond the single central area 100. Height measurements throughout the single central area 100 have a first spatial frame of reference, height measurements along the first trace 102 have a second spatial frame of reference, and height measurements along the second trace 104 have a third spatial frame of reference. The two traces 102 and 104 intersect the single central area 100 at first and second sets of coinciding points 105 and 107. The convergence algorithm can be used to adapt each of the second and third frames of reference to the first frame of reference so that differences between the coinciding points of the first and second sets 105 and 107 are minimized within a common frame of reference for the central area 100 and the first and second traces 102 and 104.

Figure 5C:
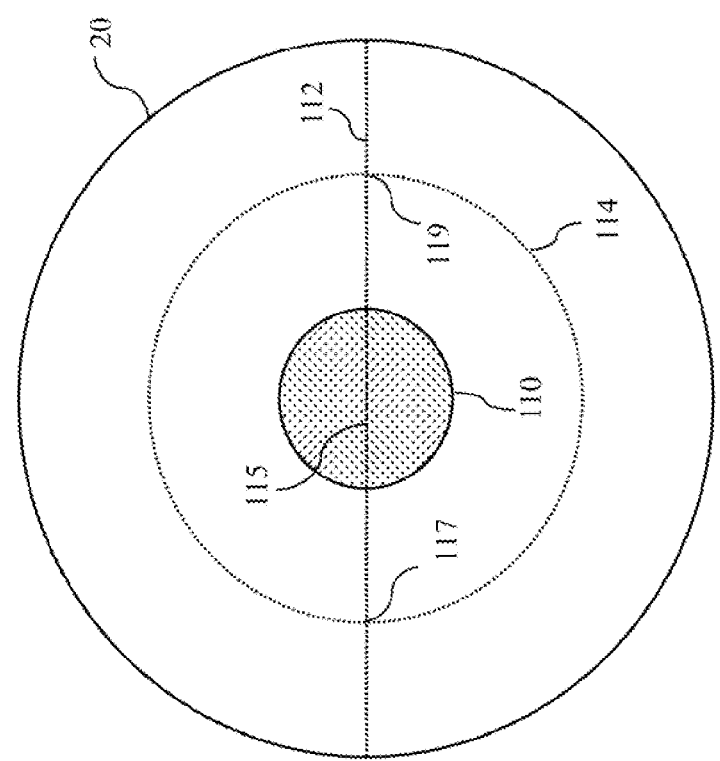

Similar to the preceding example, FIG. 5C depicts a single area 110 acquired by the optical wavefront sensor 12 and first and second traces 112 and 114 acquired by the single-point profilometer 14. In contrast to the preceding embodiment, only one of the two traces 112 and 114, namely the first trace 112, intersects the single central area 110 along a first set of nominally coinciding points 115. However, the two traces 112 and 114 intersect each other at a second set of nominally coinciding points comprising just two pairs of nominally coinciding points 117 and 119. The array of measured points within the single central area 110 shares a first frame of reference, and the successions of points along the first and second traces 112 and 114 respectively share second and third frames of reference. The algorithm performed by the processor 72 preferably relatively adapts the first, second and third frames of reference with respect to each other so that the differences between the nominally coinciding points within the first set 115 and the differences between the two pairs of nominally coinciding points 117 and 119 are collectively minimized within a common frame of reference. The adaptations can also take place sequentially such as by adapting the second and third frames of reference to an intermediate frame of reference for the first and second traces 112 and 114 and then relatively adapting the intermediate frame of reference to the first frame of reference. Alternatively, the algorithm performed by the processor 72 could firstly relatively adapt the first and second frames of reference to each other to minimize differences between the nominally coinciding points within the first set 115 within an intermediate frame of reference and secondly relatively adapt the intermediate frame of reference to the third frame of reference to minimize differences between the two pairs of nominally coinciding points 117 and 119 within the common frame of reference.

FIG. 5D depicts another example of a single central area 120 and first and second meridional traces 122 and 124. However, both meridional traces 122 and 124 intersect the single central area 120 and each other within the single central area 120. The intersection between the first and second meridional traces 122 and 124 occurs at a single pairing of nominally coinciding points 125. However, each of the two meridional traces 122 and 124 intersect the single central area 120 along two sets of nominally corresponding points 127 and 129. Since a much larger number of points are available for adapting each of the two frames of reference of the first and second meridional traces 122 and 124 to the frame of reference of the single central area 110 more weight is generally given to relatively adapting the two frames of reference of the meridional traces 122 and 124 to the frame of reference of the single central area 120 than of relatively adapting the two frames of reference of the meridional traces 122 and 124 to each other. However, if the two frames of reference of the first and second meridional traces 122 and 124 are already known to be related to an intermediate frame of reference to higher accuracy (such as by a pre-calibration), then the intermediate frame of reference could be relatively adapted to the frame of reference of the single central area 120. The various weighting schemes can also be applied on a point-by-point basis within a convergence algorithm that collectively adapts the three frames of reference to each other.

Figure 5F:
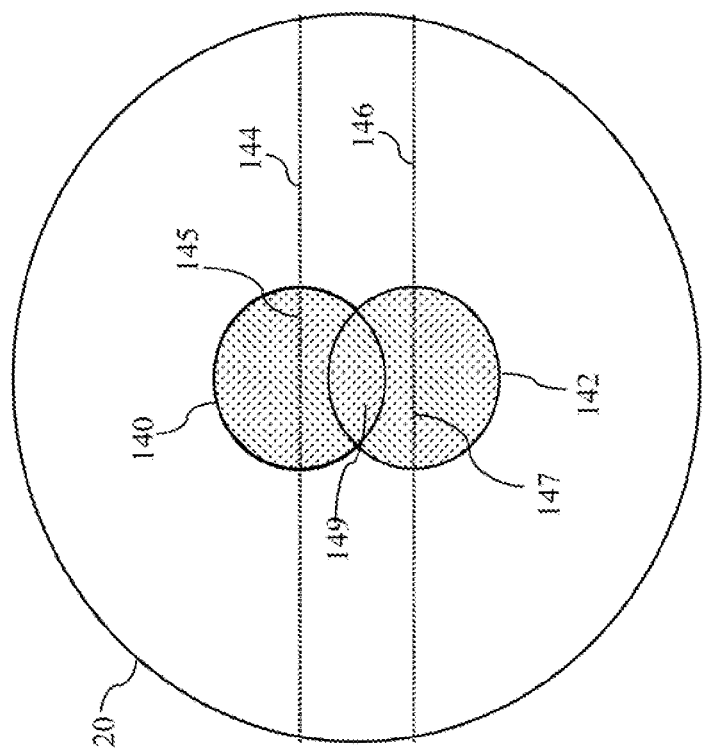
Figure 5E:
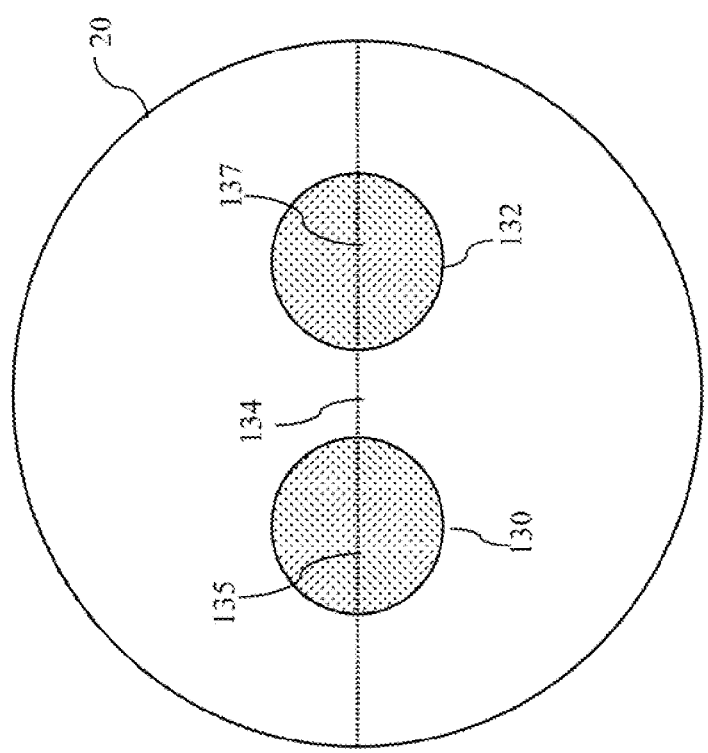

FIG. 5E depicts an example in which two areas 130 and 132 acquired by the optical wavefront sensor 12 are both intersected by a single meridional trace 134 acquired by the single-point profilometer 14. Relative motion of the optical wavefront sensor 12 with respect to the aspheric surface 20, as may be imparted by the multi-axis stage 50, is required to capture the two areas 130 and 132 such that the measured points within each area have a different spatial frame of reference. The respective frames of reference of the two areas 130 and 132 can be separately relatively adapted to the frame of reference of the meridional trace 134 to minimize their respective sets of nominally coinciding points 135 and 137. However, if the frames of reference of the two areas 130 and 132 were pre-calibrated to each other (such as by a single axis of motion), then a common intermediate frame of reference for the two areas 130 and 132 could be relatively adapted to the frame of reference of the meridional trace 134.

FIG. 5F depicts an example featuring first and second overlapping areas 140 and 142 that are respectively intersected by first and second traces 144 and 146. The frame of reference of the first trace 144 can be relatively adapted to the frame of reference of the first area 140 to minimize corresponding points 145, the frame of reference of the second trace 146 can be relatively adapted to the frame of reference of the second area 142 to minimize corresponding points 147, and the frames of reference of the first and second area 140 and 142 can be relatively adapted to each other to minimize corresponding points 149. The various adaptations can be carried out collectively or in stages (i.e., simultaneously or sequentially). Hybrid approaches can also be used, such as simultaneous stitching of batches of different frame of reference data that are then pairwise stitched.

FIG. 5G depicts a single central area 150, a plurality of concentric traces 152a-152f, and a single meridional trace 154 that intersects the single central area 150 along a set of nominally coinciding points 153 and each of the plurality of concentric traces 152a-152f at two nominally coinciding points 155a, 157a through 155f, 157f. In addition, the entire concentric trace 152a intersects the central area 150 along a set of nominally coinciding points 159. Respective frames of reference for the concentric traces 152a-152f can be relatively adapted to the frame of reference of the single meridional trace 154 by minimizing differences between the nominally coinciding points 155a, 157a through 155f, 157f within a common intermediate frame of reference, and the intermediate frame of reference can be relatively adapted to a frame of reference of the single central area 150 by minimizing differences between the two sets of nominally coinciding points 153 and 159 within a global frame of reference for the single central area 150, the plurality of concentric traces 152a-152f, and the single meridional trace 154. Of course, the order at which the adaptations are made among the frames of reference can be changed, but if the concentric trace 152a and the meridional trace 154 are to be collectively adapted to the frame of reference of the single central area 150, the frames of reference of the two traces 152a and 154 are preferably first adapted to each other. As in the previous examples, the order by which the frames of reference are adapted is presented largely as an aid to understanding the relative weights by which the adaptations are made, and such considerations can be readily incorporated into an algorithm for simultaneously adapting all of the frames of reference to a common global frame of reference.

FIG. 5H includes a similar single central area 160 and a similar plurality of concentric traces 162a-162f, but also includes a plurality of meridional traces 164a-164d. The sets of nominally coinciding points are apparent from the points and lines of overlap. The meridional traces 164a-164d overlap each other at a single point, overlap each of the concentric traces 162a-162f at two points, and overlap the central area 160 along sets of points. One of the concentric traces 162a overlaps the central area 160 along a set of points corresponding to its entire circumference. Assuming the reference frames for the central area 160 and the plurality of concentric traces 162a-162f, and the plurality of meridional traces 164a-164d are known to comparable accuracies, the relative adaptations of the frames of reference to each other is preferably weighted according to the numbers of nominal points of coincidence shared by the frames of reference.

FIG. 5I includes a central area 170, all of the concentric traces 172a-172f, and all of the meridional traces 174a-174d of FIG. 5H but also includes a cluster of additional areas 170a-170h that overlap with the central area 170. Thus, a limited region 176 measured by the optical wavefront sensor 12 is defined by the contiguous area covered by the central area 170 and the surrounding overlapping areas 170a-170h. An extended region 178 measured by the single-point profilometer 14 covers the entire aspheric surface 20. Due to the larges numbers of nominally coincident points between the areas 170 and 170a-170h, more weight is generally given to relatively adapting the frames of reference of the respective areas 170 and 170a-170h to the global frame of reference. Due to the lesser numbers of nominally coincident points, a lesser amount of weight is generally given to adapting the frames of reference of the concentric traces 172a-172c and the meridional traces 172a-172d to the global frame of reference. Due to the least numbers of nominally coinciding points, the least amount of weight is generally give to adapting the frames of reference of the remaining concentric traces 172d-172f that only intersect the meridional traces 174a-174f.

FIG. 5J includes a central area 180 that lies along a lateral series of areas 180a-180h that collectively overlap a plurality of concentric traces 182a-182f. All of the areas 180 and 180a-180h together define a limited region 186 that is measured by the optical wavefront sensor 12. The concentric traces 182a-182f, which are measured by the single-point profilometer 14, define an extended region 188 that is coextensive with the aspheric surface 20. Similar to the preceding example of FIG. 5I, the reference frames of all of the areas 180 and 180a-180h and all of the traces 182a-182f are relatively adapted to each other by minimizing points of nominal coincidence within other areas or traces thereby defining a global frame of reference for all of the areas 180 and 180a-180h, the concentric traces 182a-182f.

FIG. 5K depicts an example in which two separated limited regions 196 and 197 are measured by the optical wavefront sensor 12 and an extended region 198, which covers the entire aspheric surface 20, is measured by the single-point profilometer 14. The first limited region 196 is defined by a single central area 190, and the second limited region 197 is defined by a circumferential series of overlapping areas 190a-190p. The two limited regions 196 and 197 measured by the optical wavefront sensor 12 are interconnected by four meridional traces 194a-194d. Among a plurality of concentric traces 192a-192f, the concentric trace 192a lies entirely within the first limited region 196 and the concentric traces 192d-192f lie entirely within the second limited region 197. The various frames of reference associated with the areas 190 and 190a-190p and traces 192a-192f and 194a-194d can be relatively adapted to each other in accordance with their points of nominal coincidence. Either the order at which the respective frames of reference are related or the relative weighting represented by the order can be varied in accordance with the respective numbers of nominally coinciding points and relative certainties at which the measurements are made.

FIG. 5L features five separated limited regions of measurement that are measured by the optical wavefront sensor 12 and a sixth extended region of measurement that is measured by the single-point profilometer 14. The first limited region corresponds to the central area 200, and the limited regions two through five respectively correspond to the peripheral areas 200a through 200d. The sixth extended region, which is coextensive with the aspheric surface 20, is defined by concentric traces 202a-202f and meridional traces 204a-204b. The various frames of reference associated with the areas 200 and 200a-200d and traces 202a-202f and 204a-204b can be relatively adapted to each other in a global frame of reference in general accordance with their numbers of points of nominal coincidence. Again, the order or weighting can be changed in accordance with the accuracies of the system.

Although the various areas and traces of FIGS. 5A-5L are depicted as being disposed with radial and axial symmetry and even spacing, which is often preferred, the various areas and traces can be disposed asymmetrically and unevenly spaced to accommodate the objectives of the measurement, such as to accommodate test surfaces that lack similar symmetry or include particular regions of interest, discontinuities, or unusual features. Areas of measurement by the optical wavefront sensor can also be located at intersections of the traces measured by the single-point profilometer so that a sufficient number of nominally coinciding points are available for fully relating the traces to a common frame of reference. However, where possible, the number of axes of motion between the areas or the points along an individual trace is preferably minimized. In addition, the various areas and traces can be combined to calibrate the optical wave front sensor 12 and single-point profilometer 14 individually or with respect to each other.

An example of an integrated optical wavefront sensor and single-point profilometer 210 in which an optical wavefront sensor 212 and a single point profilometer 214 are arranged in parallel is depicted by FIG. 6. The optical wavefront sensor 212 operates along a first optical axis 216, and the single-point profilometer 204 operates along a second parallel optical axis 276. A common multi-axis stage 250 similar to the multi-axis stage 50 of FIGS. 1-3 is adapted for increased travel along its X axis to position the aspheric test surface 20 for measurement along either optical axis 216 or 276 for alternately measuring the aspheric test surface 20 with the optical wavefront sensor 212 or the a single-point profilometer 214.

The components of the optical wavefront sensor 212 can be similar to the components already described for the optical wavefront sensor 12. However, the components can be optimized for wavefront sensing. For example, a light source 218 is preferably optimized with respect to the spatial and temporal coherence requirements of the optical wavefront sensor 212. A collimating optic 226 converts a diverging measuring beam 222 emitted by the light source 218 into a collimated measuring beam 228 having a planar wavefront. An objective 230 includes a wavefront shaper 232 comprising one or more beam-shaping optics for generating a converging test beam 234 having a spherical test wavefront 236, which is sized to approximately match the curvature of the area 38 on the aspheric test surface 20. For further optimizing the optical wavefront sensor 212 to accommodate greater variations in the aspheric test surface 20, alternative or adjustable beam shaping optics within the wavefront shaper 232 can be used for generating test beams having other shapes.

The test part 46 having the aspheric test surface 20 is mounted on a multi-axis stage 250 that is similar to the multi-axis stage 50 but includes an extended range of travel along the X axis for shifting the aspheric surface 20 between positions for measurement by either the optical wavefront sensor 212 or the single-point profilometer 214.

The aspheric test surface 20 is located along the optical axis 216 at a confocal position of the optical wavefront sensor 212 so that any changes, i.e., aberrations, in the test wavefront 252 retroreflected from the aspheric test surface 20 correspond to differences between the shape of the area 38 and the original shape of the test wavefront 236.

The objective 230 converts the returning aberrated test wavefront 252 into an aberrated planar test wavefront 254. The collimating optic 226 in conjunction with another imaging optic 256 relays the aberrated planar test wavefront 254 to a detector 260. In addition, the objective 230, together with the relaying optics 226 and 256, images the area 38 of the aspheric test surface 20 onto a detector surface 262 of the detector 260 for relating pixels of the detector surface 262 to corresponding points within the area 238. The detector 260 measures local variations in the shape of the aberrated planar test wavefront 254 from its original planar form as a measure of corresponding local height variations in the aspheric test surface 20. The actual height variation is approximately one-half of the local aberration in the test wavefront 254 because the original test wavefront 236 encounters the aspheric test surface 20 under reflection.

As described thus far, the detector 260 can be a wavefront sensor such as a Shack-Hartman wavefront sensor that compares the aberrated planar test wavefront 254 against a planar or similar datum defined by the wavefront sensor itself. However, the optical wavefront sensor 212 can also be arranged as an interferometer, e.g., a Fizeau interferometer, as described with respect to the embodiment of FIG. 1 for comparing the aberrated test wavefront 254 against a reference wavefront that is transmitted through a number of optics in common with the aberrated test wavefront 254. Generally, the comparative test and reference wavefront measurements of the optical wavefront sensor 212 arranged as an interferometer can be made to higher accuracy than wavefront measurements made directly against a reference datum but the range of unambiguous measurement is less.

While all of the points measured within an individual area, e.g., 38, of the aspheric test surface 20 can share a common spatial frame of reference derived from the settings of the multi-axis stage 250, different areas captured at different relative positions and orientations of the aspheric test surface 20 with respect to the optical wavefront sensor 212 are associated with different spatial frames of reference. Any differences in the shapes of the test wavefronts 236 between the different measurement positions are also referenced within the different spatial frames of reference.

The single-point profilometer 214 has its own light source 278, which can be adapted to a preferred measurement technique, including sources that would not be effective for taking measurements with the optical wavefront sensor 212. A measuring beam 282 diverging from the light source 278 is redirected by a beamsplitter 284 along the optical axis 276 to a focusing optic 286 that converges the measuring beam 282 to a focus 266 on the aspheric test surface 20. While the individual rays comprising the converging measuring beam 282 are inverted upon reflection from the aspheric test surface 20 in accordance with their respective angles of incidence, the overall form of a reflected measuring beam 288 remains unchanged by reflections at the point of focus 266. However, any deviations in the aspheric test surface 20 from the point of focus 266 changes the relative orientation and distributions of rays within the reflected measuring beam 288. For example, even small variations in the position or slope the minute area of the aspheric test surface 20 illuminated by the point of focus 266 produce changes in the reflected measuring beam 288. The focusing optic 286 re-converges the reflected measuring beam 288 onto a detector 270, which analyzes any changes in the reflected test beam 288 as a measure of local deviations in the aspheric test surface 20. The changes in the reflected test beam 288 can be converted directly into measures of surface height variations or indirectly by guiding measured relative displacements of the aspheric test surface 20 to reach a better focus position.

Similar to the arrangement of the single-point profilometer 14 of FIGS. 1-3 for measuring multiple points on the aspheric test surface 20, the aspheric test surface 20 is moved relative to single point profilometer 214 for capturing points along predefined traces. Preferably, a minimum number of axes of motion, and more preferably a single axis of motion, are used to capture points along the individual traces. Each such axis of motion is preferably a high precision axis, whose position can be accurately monitored within the lateral resolution required for distinguishing points on the aspheric test surface 20. The points along each such trace preferably share a common spatial frame of reference, and each such trace can have a different frame of reference associated with the axes of motion that are fixed throughout the trace.

Like the integrated optical wavefront sensor and single-point profilometer 10, the integrated optical wavefront sensor and single-point profilometer 210 is particularly useful for extending the range of aspheric surfaces that can be measured to high accuracy. A limited region of the aspheric test surface 20 is measured by the optical wavefront sensor 212 whose range of measurement is more limited than the single-point profilometer 214. An extended region that overlaps with but extends beyond the limited region is measured by the single-point profilometer 214. As such, at least one trace measured by the single-point profilometer 214 overlaps at least one area measured by the optical wavefront sensor 212. Differences between points of nominal coincidence between the area and trace can be used to relatively adapt the respective frames of reference associated with the array of points within the area and the succession of points along the trace to a common frame of reference for all of the points within the area and along the trace. FIGS. 5A-5L illustrate other combinations of areas and traces, whose measurements can be integrated for producing a composite measurement of the aspheric test surface 20.

Similar to the integrated optical wavefront sensor and the single-point profilometer 10, the optical wavefront sensor 212 and the single-point profilometer 214 can be used together for additional purposes such as calibrating integrated optical wavefront sensor and the single-point profilometer 210 to the aspheric test surface 20, determining the radius of curvature of the test wavefront of the optical wavefront sensor 212, or improving the accuracy or reliability of measurements taken by either the optical wavefront sensor 212 or the single-point profilometer 214.

Although the optical axis 216 of the optical wavefront sensor 212 and the optical axis 276 of the single-point profilometer 214 are shown arranged in parallel. The two axes 216 and 276 can oriented in different (non-parallel) directions so long as differences between the frames of reference of the two measurements are known or determined. In addition, although the single-point profilometer preferably includes an optical probe, the single-point profilometer could alternatively include a mechanical probe or perform another sort of point-by-point measurement. Regardless of its form, the single-point profilometer can be integrated to varying degrees with the optical wavefront sensor to measure a larger range of aspheric surfaces or to measure such surfaces to higher accuracy.

In addition to measuring a larger range of aspheric surfaces including areas not amenable to measurement by optical wavefront sensors alone, the integrated wavefront sensor and single-point profilometer can be used to measure common areas or entire aspheric surfaces with both the optical wavefront sensor and the single-point profilometer to measure the aspheric surfaces to higher accuracy. For example, a trace measurement of the single-point profilometer might have low uncertainty in spherical aberration but poor lateral resolution, while an area measurement of the optical wavefront sensor might have high uncertainty in spherical but excellent lateral resolution.

The invention claimed is:

1. Apparatus for measuring aspheric test surfaces comprising:
    an optical wavefront sensor for measuring surface height variations throughout one or more areas of an aspheric test surface within a limited region of the aspheric surface,
    a single-point profilometer for measuring surface height variations along one or more traces on the aspheric test surface within an extended region of the aspheric surface, the extended region overlapping at least a portion of the limited region and extending beyond the limited region,
    at least one of the one or more traces overlapping at least one of the one or more areas on the aspheric test surface defining a set of overlapping surface height measurements; and
    a processor that combines the surface height measurements of the optical wavefront sensor within the limited region with the surface height measurements of the single-point profilometer within the extended region by minimizing differences within the set of overlapping surface height measurements for producing an integrated measurement of the limited and extended regions within a common frame of reference.

2. The apparatus of claim 1 in which (a) the optical wavefront sensor measures an array of points within each of the one or more areas, (b) the single-point profilometer measures a succession of points on the aspheric test surface along each of the one or more traces, and (c) at least one of the traces intersects at least one of the areas at nominally coinciding points on the aspheric test surface.

3. The apparatus of claim 2 in which relative motion between the single-point profilometer and the aspheric test surface for taking measurements along each of the one or more traces is imparted by a single axis of motion.

4. The apparatus of claim 2 in which the processor performs an algorithm that relatively adapts a spatial frame of reference of the succession of measured points of the at least one trace to a spatial frame of reference of the array of measured points within the at least one area so that differences between the nominally coinciding points are minimized within a common frame of reference for both the array of measured points throughout the at least one area and the succession of measured points along the at least one trace.

5. The apparatus of claim 2 in which (a) the one or more areas include a first area having a first frame of reference, (b) the one or more traces include a first trace having a second frame of reference and a second trace having a third frame of reference (c) the first and second traces intersect the first area at first and second sets of nominally coinciding points on the aspheric test surface, and (d) the algorithm performed by the processor relatively adapts each of the second and third frames of reference to the first frame of reference so that differences between the nominally coinciding points within each of the first and second sets are minimized within a common frame of reference for the first area and the first and second traces.

6. The apparatus of claim 2 in which (a) the one or more areas include a first area having a first frame of reference and a second area having a second frame of reference, (b) the one or more traces include a first trace having a third frame of reference, (c) the first trace intersects the first and second areas at first and second sets of nominally coinciding points on the aspheric test surface, (d) the algorithm performed by the processor relatively adapts the first and second frames of reference to the third frame of reference so that differences between the nominally coinciding points within the first and second sets of nominally coinciding points are minimized within a common frame of reference for the first and second areas and the first trace.

7. The apparatus of claim 1 in which the optical wavefront sensor includes a wavefront shaper for producing one or more measurement wavefronts each having a shape approximating a shape of the one or more areas of the aspheric test surface, and further comprising an imaging system for imaging each of the one or more areas of the aspheric test surface onto a detector for comparing the shape of each of the one or more measurement wavefronts to the shape of each of the one or more areas of the aspheric test surface.

8. The apparatus of claim 7 in which the wavefront shaper forms a spherical measurement wavefront and the single-point profilometer focuses light through the wavefront shaper onto the aspheric test surface.

9. The apparatus of claim 7 further comprising one or more motion stages for relatively moving the optical wavefront sensor and the single-point profilometer with respect to a mounting fixture for the aspheric test surface for measuring both the one or more areas of an aspheric test surface within the limited region and the one or more traces on the aspheric test surface within the extended region.

10. The apparatus of claim 9 in which the one or more motion stages also provide for relatively moving the single-point profilometer with respect to the mounting fixture for the aspheric test surface for measuring surface height variations of points on the aspheric test surface within the limited region and the processor also provides for relating the surface height measurements of the points on the aspheric test surface within the limited region to surface height measurements of nominally coinciding points of the one or more areas of the aspheric test surface within the limited region.

11. The apparatus of claim 10 in which the one or more motion stages relatively move the single-point profilometer for measuring successions of points along each of the one or more traces on the aspheric test surface, and at least one of the one or more traces intersects the limited region of the aspheric test surface.

12. The apparatus of claim 11 in which the processor also provides for relating the surface height measurements of a plurality of the traces to each other using measures of the surface height measurements of nominally coinciding points of the one or more areas of the aspheric test surface within the limited region.

13. The apparatus of claim 7 in which the optical wavefront sensor includes an interferometer.

14. The apparatus of claim 7 in which the optical wavefront sensor includes a Shack-Hartman wavefront sensor.

15. The apparatus of claim 7 in which one or more motion stages provide for relatively adjusting the aspheric test surface with respect to the wavefront shaper to a first position for retroreflecting the measurement wavefronts at near normal incidence to the one or more areas of aspheric test surface and provide for relatively adjusting the aspheric surface with respect to the wavefront shaper to a second position for focusing light onto each of a succession of points along each of the one or more traces on aspheric test surface.

16. The apparatus of claim 15 further comprising a common light source for the optical wavefront sensor and the single-point profilometer.

17. The apparatus of claim 15 further comprising a distance measuring gauge for measuring distances between the first and second positions.

18. The apparatus of claim 17 in which the processor also provides for converting the measured distances between the first and second positions into radii of curvature of the measurement wavefront.

19. The apparatus of claim 7 in which wavefront shaper is part of a Fizeau interferometer having a reference surface for dividing the measurement wavefronts into reference wavefronts that are reflected from the reference surface and test wavefronts that are transmitted to and reflected from the aspheric test surface.

20. A method of measuring aspheric test surfaces comprising steps of:
generating one or more measurement wavefronts with a wavefront shaper, each of the one or more measurement wavefronts having a curved shape approximating a curved shape of each of one or more areas of the aspheric test surface within a limited region of the aspheric test surface;
imaging the one or more measurement wavefronts reflected from the one or more areas of the aspheric test surface onto a detector;
comparing the one or more imaged measurement wavefronts to a datum for obtaining measurements of surface height variations throughout each of the one or more areas of the aspheric test surface;
focusing light with a single-point profilometer onto each of a succession of points along of one or more traces on the aspheric test surface within an extended region of the aspheric test surface, the extended region including both a portion that overlaps at least a portion of the limited region and a portion that does not overlap any portion of the limited region;
monitoring signals from the single-point profilometer for obtaining measurements of surface height variations among the succession of points along the one or more traces on the aspheric test surface; and
combining the surface height measurements of the optical wavefront sensor within the limited region with the surface height measurements of the single-point profilometer within the extended region by minimizing differences between the surface height measurements of the optical wavefront sensor and the single-point profilometer within the overlapping portions the limited and extended regions for producing an integrated array of surface height measurements for a combined region of the aspheric test surface that includes both the overlapping portions of the limited and extended regions and the non-overlapping portion of the extended region.

21. The method of claim 20 in which (a) the optical wavefront sensor measures an array of points throughout each of the one or more areas and (b) at least one of the traces intersects at least one of the areas at nominally coinciding points on the aspheric test surface.

22. The method of claim 21 in which the single-point profilometer is relatively moved with respect to the aspheric test surface though a single axis of relative motion along at least one of the traces.

23. The method of claim 21 in which the step of combining relatively adapts a spatial frame of reference of the array of measured points throughout the at least one area to a spatial frame of reference of the succession of measured points along at least one trace so that differences between the nominally coinciding points are minimized within a common frame of reference for both the array of measured points throughout the at least one area and the succession of measured points along the at least one trace.

24. The method of claim 21 in which (a) the one or more areas include a first area having a first frame of reference, (b) the one or more traces include a first trace having a second frame of reference and a second trace having a third frame of reference, (c) the first and second traces intersect the first area at first and second sets of nominally coinciding points on the aspheric test surface, and (d) the step of combining relatively adapts each of the second and third frames of reference to the first frame of reference so that differences between the nominally coinciding points within each of the first and second sets are minimized within a common frame of reference for the first area and the first and second traces.

25. The method of claim 21 in which (a) the one or more areas include a first area having a first frame of reference and a second area having a second frame of reference, (b) the one or more traces include a first trace having a third frame of reference, (c) the first trace intersects the first and second areas at first and second sets of nominally coinciding points on the aspheric test surface, (d) the step of combining relatively adapts the first and second frames of reference to the third frame of reference so that differences between the nominally coinciding points within the first and second sets of nominally coinciding points are minimized within a common frame of reference for the first and second areas and the first trace.

26. The method of claim 20 including a step of relatively moving the single-point profilometer with respect to a mounting fixture for the aspheric test surface for measuring the surface height variations among the succession of points along each of the one or more traces on the aspheric test surface within the extended region, wherein at least some of the succession of points along at least one of the traces within the extended region are also within the limited region.

27. The method of claim 26 in which the step of combining relates the surface height measurements of the succession of points along the one or more traces on the aspheric test surface within both the limited and extended regions to the surface height measurements of nominally coinciding points of the one or more areas of the aspheric test surface within the limited region.

28. The method of claim 26 in which the step of relatively moving includes relatively adjusting the aspheric test surface to a first position for retroreflecting the measurement wavefronts at nearly normal incidence to the one or more areas of aspheric test surface and to a second position for focusing light onto each of the succession of points along the one or more traces on aspheric test surface.

29. The method of claim 28 including steps of measuring distances between the first and second positions and converting the measured distances between the first and second positions into local radii of curvature of the aspheric test surface.

30. The method of claim 20 including steps of (a) dividing the one or more measurement wavefronts into a reference wavefront that is reflected from the reference surface and a test wavefront that is transmitted to and reflected from the aspheric test surface, and (b) propagating the test wavefront in an evolving form that approximates the shape of each of the one or more areas of the aspheric test surface at positions of nearly normal incidence with the aspheric test surface.

31. Apparatus for measuring aspheric test surfaces comprising:
an optical wavefront sensor for measuring surface height variations throughout one or more areas of an aspheric test surface, the surface height measurements throughout each of the one or more areas having a common area spatial frame of reference defined by a set of wavefront sensor compensators, each having an amplitude and a functional form representing the influence of a known variable on the common area spatial frame of reference;
a single-point profilometer for measuring surface height variations along one or more traces on the aspheric test surface, the surface height measurements along each of the one or more traces having a common trace spatial frame of reference defined by a set of profilometer compensators, each having an amplitude and a functional form representing the influence of a known variable on the common trace spatial frame of reference;
at least one of the one or more traces overlapping at least one of the one or more areas on the aspheric test surface defining a set of overlapping surface height measurements; and
a processor that combines the surface height measurements of the optical wavefront sensor with the surface height measurements of the single-point profilometer by identifying amplitudes of the wavefront sensor compensators and the profilometer compensators whereby differences between the overlapping surface height measurements of the optical wavefront sensor and the single-point profilometer are minimized.

* * * * *